US012559972B2

(12) United States Patent
Yamamoto

(10) Patent No.: US 12,559,972 B2
(45) Date of Patent: Feb. 24, 2026

(54) VEHICLE-MOUNTED APPARATUS

(71) Applicant: YOKOWO CO., LTD., Tokyo (JP)

(72) Inventor: Tsugio Yamamoto, Tokyo (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 18/283,452

(22) PCT Filed: Apr. 25, 2022

(86) PCT No.: PCT/JP2022/018657
§ 371 (c)(1),
(2) Date: Sep. 22, 2023

(87) PCT Pub. No.: WO2022/249826
PCT Pub. Date: Dec. 1, 2022

(65) Prior Publication Data
US 2024/0175292 A1     May 30, 2024

(30) Foreign Application Priority Data
May 27, 2021     (JP) ................................ 2021-089397

(51) Int. Cl.
*E05B 19/00*          (2006.01)
*B60R 25/20*          (2013.01)
*G06Q 50/43*          (2024.01)

(52) U.S. Cl.
CPC .......... *E05B 19/0005* (2013.01); *B60R 25/20* (2013.01); *G06Q 50/43* (2024.01)

(58) Field of Classification Search
CPC ...... E05B 19/0005; E05B 19/00; E05B 49/00; B60R 25/20; B60R 25/24; G06Q 50/43; G06Q 50/01
See application file for complete search history.

(56) References Cited

U.S. PATENT DOCUMENTS

| | | | | |
|---|---|---|---|---|
| 5,947,038 A | * | 9/1999 | Smith | ................. E05B 19/0005 40/202 |
| 6,611,232 B1 | * | 8/2003 | Wunderlich | ............ B60R 25/10 342/463 |
| 9,208,456 B2 | * | 12/2015 | McGinn | .................. B60R 25/00 |
| 10,589,720 B1 | * | 3/2020 | Tang | ................... G07C 9/00309 |
| 10,891,814 B2 | * | 1/2021 | Briskey | .................... G07C 9/27 |
| 2005/0242930 A1 | * | 11/2005 | Nicolson | ............ E05B 65/0075 340/426.36 |
| 2007/0273534 A1 | * | 11/2007 | McGinn | ............. G07C 9/00174 340/572.8 |

(Continued)

FOREIGN PATENT DOCUMENTS

| | | |
|---|---|---|
| JP | 2001-329726 A | 11/2001 |
| JP | 2006-249889 A | 9/2006 |

(Continued)

*Primary Examiner* — Nay Tun
(74) *Attorney, Agent, or Firm* — XSENSUS LLP

(57) ABSTRACT

A vehicle-mounted apparatus for accommodating an electronic key of a vehicle, the apparatus comprises a speaker; a light emitting unit; an audio control unit configured to control the speaker to emit given audio guidance related to a handling procedure of the vehicle-mounted apparatus when the vehicle is used; and a lighting control unit configured to control lighting of the light emitting unit in conjunction with audio emission control of the audio guidance by the audio control unit.

7 Claims, 16 Drawing Sheets

(56) References Cited

U.S. PATENT DOCUMENTS

| | | | |
|---|---|---|---|
| 2009/0150306 A1* | 6/2009 | Campbell ........... | E05B 19/0005 |
| | | | 705/500 |
| 2011/0191126 A1* | 8/2011 | Hampshire ........... | G06Q 10/02 |
| | | | 705/5 |
| 2020/0299998 A1* | 9/2020 | Testa ................. | G07C 9/00174 |
| 2021/0241552 A1* | 8/2021 | Jonely ............... | G07C 9/00944 |
| 2021/0293075 A1* | 9/2021 | Oesterling ............. | H04W 4/40 |

FOREIGN PATENT DOCUMENTS

| | | | |
|---|---|---|---|
| JP | 2019-109702 A | 7/2019 | |
| JP | 6710832 B1 | 6/2020 | |

\* cited by examiner

Figure 11:
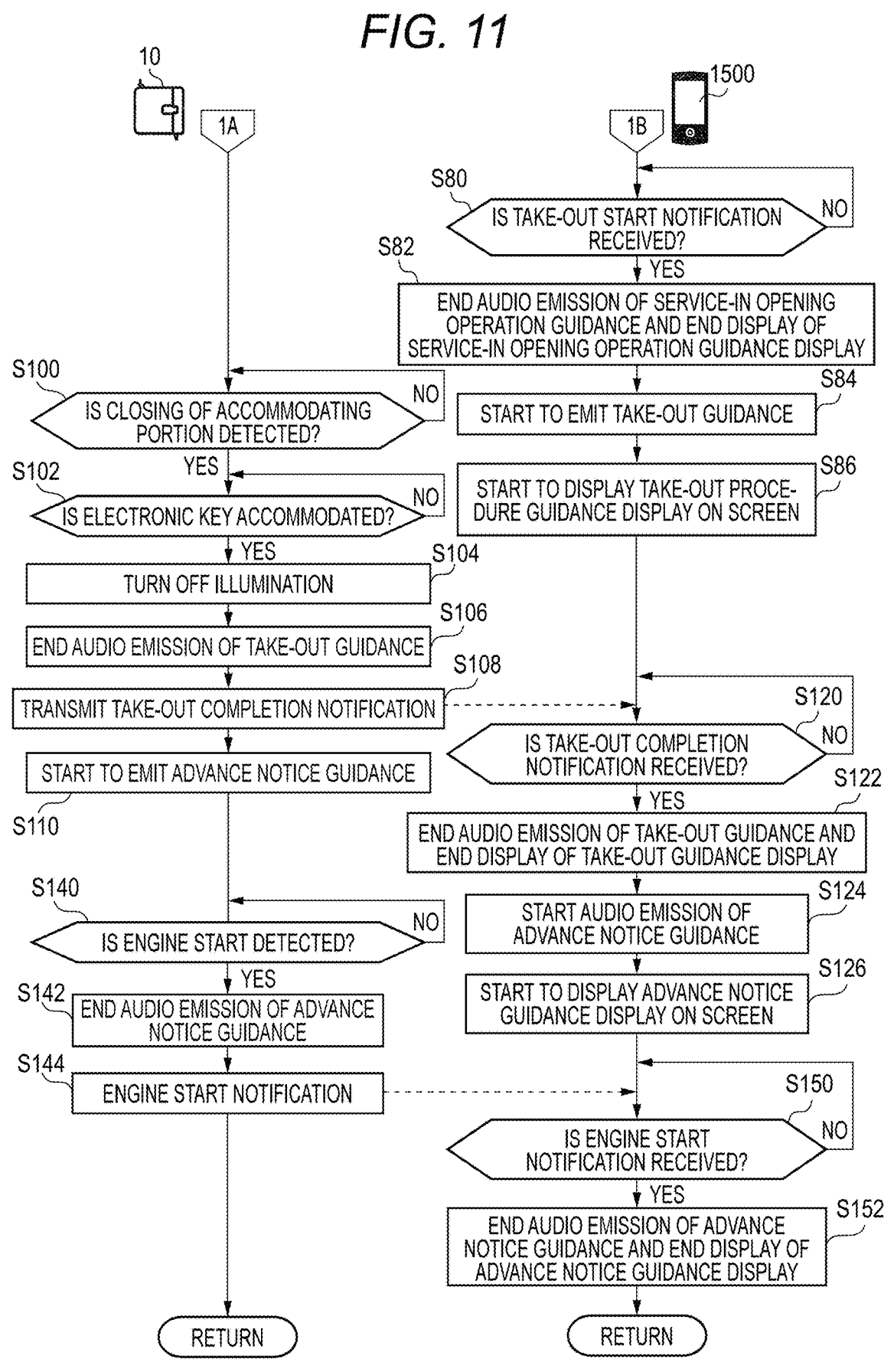

IS TAKE-OUT START NOTIFICATION RECEIVED?  —NO

YES

S82

END AUDIO EMISSION OF SERVICE-IN OPENING OPERATION GUIDANCE AND END DISPLAY OF SERVICE-IN OPENING OPERATION GUIDANCE DISPLAY

S100

IS CLOSING OF ACCOMMODATING PORTION DETECTED?  —NO

S84

START TO EMIT TAKE-OUT GUIDANCE

YES

S102

IS ELECTRONIC KEY ACCOMMODATED?  —NO

S86

START TO DISPLAY TAKE-OUT PROCE-DURE GUIDANCE DISPLAY ON SCREEN

YES

S104

TURN OFF ILLUMINATION

S106

END AUDIO EMISSION OF TAKE-OUT GUIDANCE

S108

TRANSMIT TAKE-OUT COMPLETION NOTIFICATION

S120

IS TAKE-OUT COMPLETION NOTIFICATION RECEIVED?  —NO

START TO EMIT ADVANCE NOTICE GUIDANCE

YES

S122

S110

END AUDIO EMISSION OF TAKE-OUT GUIDANCE AND END DISPLAY OF TAKE-OUT GUIDANCE DISPLAY

S140

IS ENGINE START DETECTED?  —NO

S124

START AUDIO EMISSION OF ADVANCE NOTICE GUIDANCE

YES

S142

END AUDIO EMISSION OF ADVANCE NOTICE GUIDANCE

S126

START TO DISPLAY ADVANCE NOTICE GUIDANCE DISPLAY ON SCREEN

S144

ENGINE START NOTIFICATION

S150

IS ENGINE START NOTIFICATION RECEIVED?  —NO

YES

S152

END AUDIO EMISSION OF ADVANCE NOTICE GUIDANCE AND END DISPLAY OF ADVANCE NOTICE GUIDANCE DISPLAY

RETURN

RETURN

TAKE OUT

CLOSE

FIT WITH THE BUTTON
FACING UPWARD

CLOSE

VEHICLE-MOUNTED APPARATUS

CROSS-REFERENCE TO RELATED APPLICATIONS

The present application is based on PCT filing PCT/JP2022/018657, filed Apr. 25, 2022, which claims priority from Japanese Patent Application No. 2021-089397, filed May 27, 2021, the entire contents of each are incorporated herein by reference.

TECHNICAL FIELD

The present invention relates to a vehicle-mounted apparatus that accommodates an electronic key of a vehicle.

BACKGROUND ART

As a form of vehicle use, there is a form in which a plurality of people share one or a plurality of vehicles. This includes car sharing and rental cars. Hereinafter, such use forms are collectively referred to as "sharing".

In sharing, it is important to handle a key for using a vehicle to be shared. For example, Patent Literature 1 discloses a technology of a vehicle-mounted apparatus that accommodates an electronic key that can be used for sharing or the like.

CITATION LIST

Patent Literature

Patent Literature 1: Japanese Patent No. 6710832

SUMMARY OF INVENTION

Technical Problem

It is desirable that various users who use a vehicle in sharing can smoothly use the vehicle-mounted apparatus in various situations and environments.

For example, when the vehicle-mounted apparatus is installed in a glove box of the vehicle, depending on an installation position, there is a possibility that brightness (environmental light) necessary for the user to take out the key or return the key cannot be ensured. When the vehicle is parked at night or in the dark, it is even more difficult to ensure brightness.

The first-time user of vehicle sharing using the vehicle-mounted apparatus can prepare in advance based on a leaflet or a website for how and when to operate the vehicle-mounted apparatus from service-in (vehicle use start, sharing start) to service-out (vehicle return, sharing end). However, not all the users use the vehicle after correctly learning all procedures for handling the vehicle-mounted apparatus. Rather, it can be said that it is ideal that such advance preparation is unnecessary.

An object of the present invention is to improve usability of a vehicle-mounted apparatus that accommodates an electronic key.

Solution to Problem

According to an aspect of the present invention, there is provided a vehicle-mounted apparatus for accommodating an electronic key of a vehicle, and the vehicle-mounted apparatus comprises: a speaker; a light emitting unit; an audio control unit configured to control the speaker to emit given audio guidance related to a handling procedure of the vehicle-mounted apparatus when the vehicle is used; and a lighting control unit configured to control lighting of the light emitting unit in conjunction with audio emission control of the audio guidance by the audio control unit.

According to this aspect, the vehicle-mounted apparatus can emit the audio guidance related to the handling procedure of the vehicle-mounted apparatus when the vehicle is used, and control the lighting of the light emitting unit in conjunction with the audio guidance. A user can be accurately notified of a part to be operated at a timing when an operation is to be performed. The lighting of the light emitting unit can provide illumination necessary for an operation of taking out the electronic key or an operation of returning the electronic key (an operation of accommodating the electronic key). According to this aspect, usability of the vehicle-mounted apparatus that accommodates the electronic key can be improved.

BRIEF DESCRIPTION OF DRAWINGS

FIG. 11 is a flowchart following FIG. 10.

DESCRIPTION OF EMBODIMENTS

Figure 1:
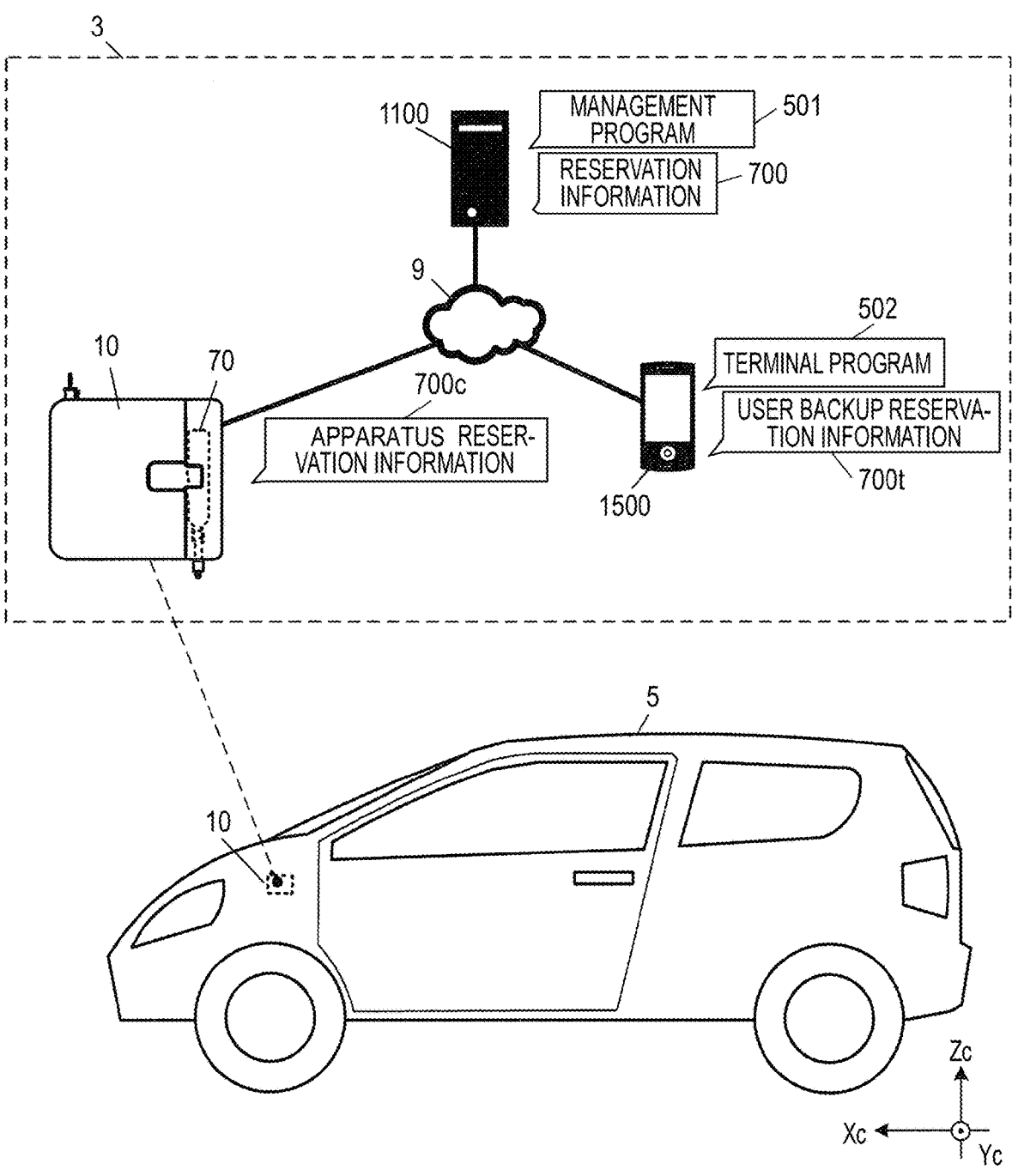
FIG. 1 is a diagram showing an example of a system configuration of a sharing system.

Hereinafter, examples of embodiments to which the present invention is applied will be described, but the embodiments to which the present invention can be applied are not limited to the following. FIG. 1 shows orthogonal three axes (Xc, Yc, Zc) of a right-hand system indicating directions for describing a vehicle. FIGS. 2A to 7 show orthogonal three axes (X, Y, Z) of a right-hand system indicating directions for describing a vehicle-mounted apparatus. It is assumed that an Xc-axis direction and an X-axis direction are parallel, a Yc-axis direction and a Y-axis direction are parallel, and a Zc-axis direction and a Z-axis direction are parallel. In the following description, a Zc, Z-axis plus direction is defined as upper, a Zc, Z-axis minus direction is defined as lower, an Xc, X-axis plus direction is defined as front, an Xc, X-axis minus direction is defined as rear, a Yc, Y-axis plus direction is defined as left, and a Yc, Y-axis minus direction is defined as right. The X-axis direction may be any direction along the Xc-axis direction, and may not necessarily be parallel thereto. Similarly, the Y-axis direction may be any direction along the Yc-axis direction, and may not necessarily be parallel thereto. The Z-axis direction may be any direction along the Zc-axis direction, and may not necessarily be parallel thereto.

FIG. 1 is a diagram showing an example of a system configuration of a sharing system. A sharing system 3 includes a vehicle-mounted apparatus 10, a server system 1100, and a user terminal 1500. The apparatus 10 accommodates an electronic key 70 of a vehicle 5 to be shared. The server system 1100 communicates with the apparatus 10 via a network 9. The user terminal 1500 communicates with the apparatus 10 and the server system 1100 via the network 9. A "user" in this specification is a person who uses the vehicle 5, that is, an end user. A system user who operates the sharing system 3 is referred to as an "administrator".

The network 9 refers to a communication path that enables data communication. The network 9 refers to a local area network (LAN) based on a dedicated line (dedicated cable) for direct connection, Ethernet (registered trademark), or the like, and a communication network such as a telephone communication network, a cable network, the Internet, or short-range wireless, and a communication method thereof may be wired or wireless.

The server system 1100 performs user registration for the sharing system 3, reservation management, and provision of reservation information to the user terminal 1500 and the apparatus 10. Specifically, the server system 1100 stores a management program 501 and executes the stored management program 501 to implement (1) a user registration function, (2) a reservation setting function for the vehicle 5, (3) a function of generating reservation information 700 (including, for example, a unique reservation ID, a reserved vehicle ID, a reservation period, and a password), (4) a function of providing a copy of the reservation information 700 (user backup reservation information 700t) to the user terminal 1500, and (5) a function of providing a copy of the reservation information 700 (apparatus reservation information 700c) to the apparatus 10.

The user terminal 1500 is a terminal that can be communicably connected to the network 9, and is a computer system used by a user who wants to share the vehicle 5. For example, the user terminal 1500 is implemented by a smartphone, a tablet computer, a notebook computer, or a wearable computer.

The user terminal 1500 can store an application program and execute the stored application program. The user terminal 1500 stores a terminal program 502 as the application program. By executing the terminal program 502, the user terminal 1500 implements (1) a function of performing a reservation procedure for the vehicle 5 by accessing the server system 1100 and acquiring and storing the user backup reservation information 700t, (2) a function of performing data communication with the apparatus 10, (3) a function of providing the user backup reservation information 700t and receiving authentication in a state in which communication with the apparatus 10 is possible, (4) a function of unlocking by performing a predetermined unlocking request to the apparatus 10 according to an unlocking operation on the user terminal 1500 by the user after the authentication, and (5) a function of locking by performing a predetermined locking request to the apparatus 10 according to a locking operation on the user terminal 1500 by the user after the authentication.

The apparatus 10 is mounted on the vehicle 5 to be shared. The apparatus 10 is attached inside the vehicle (for example, in a glove box, on a dashboard, in a console box, at the foot of a driver seat or a passenger seat, and in a trunk room).

Figure 2A:
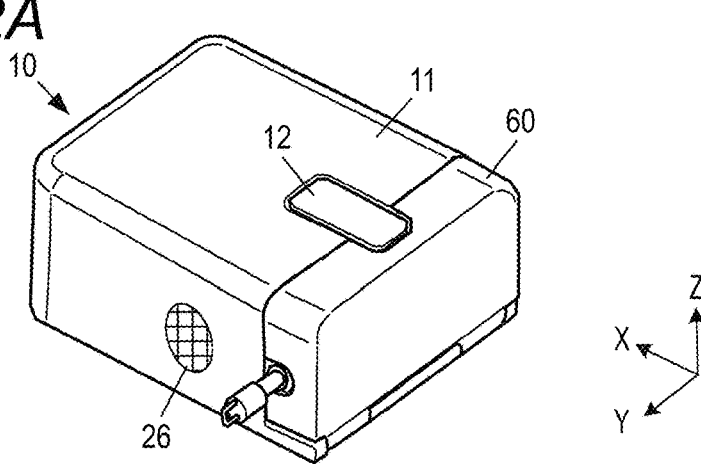
FIG. 2A is a diagram showing an example of a state transition process of a vehicle-mounted apparatus when using a service of the sharing system.
Figure 2B:
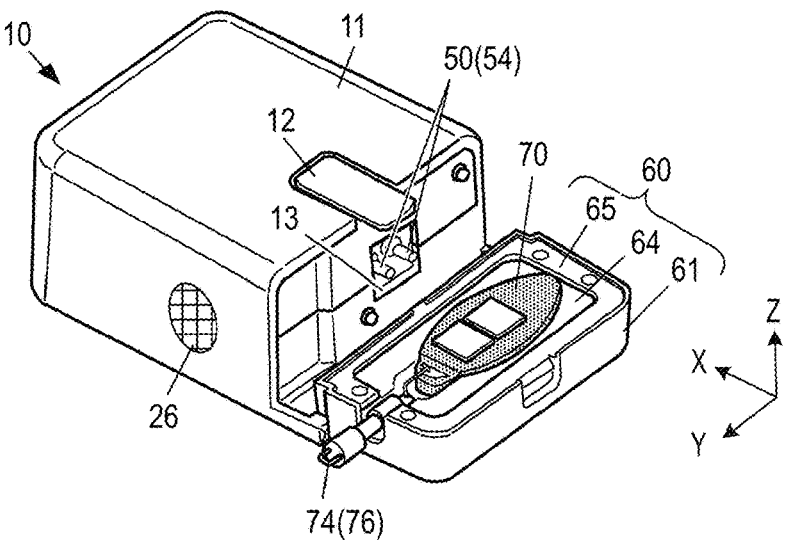
FIG. 2B is a diagram showing the example of the state transition process of the vehicle-mounted apparatus when using the service of the sharing system.
Figure 2C:
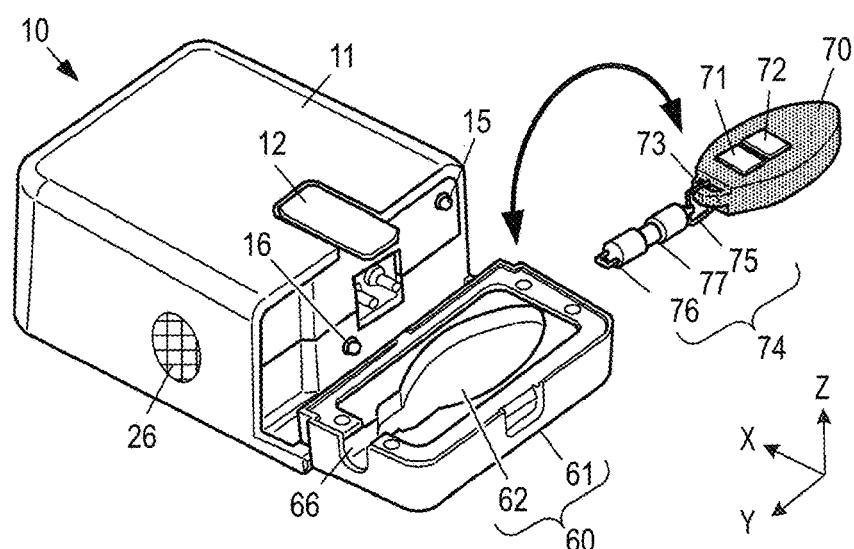
FIG. 2C is a diagram showing the example of the state transition process of the vehicle-mounted apparatus when using the service of the sharing system.

FIGS. 2A to 2C are diagrams showing an example of a state transition process of the apparatus 10 when using a service of the sharing system 3. The apparatus 10 includes a main case portion 11 and an accommodating portion 60 serving as a lid portion that is swung to open and close with respect to the main case portion 11. When the user operates an opening and closing operation unit 12 provided on an upper portion of the main case portion 11, coupling between the main case portion 11 and the accommodating portion 60 is released. Then, the accommodating portion 60 is swingable, and changes from a closed state shown in FIG. 2A to an open state shown in FIG. 2B. In the open state, the accommodating portion 60 opens to a posture in which the accommodated electronic key 70 is exposed upward (in the Z-axis plus direction).

A speaker 26 is provided on one side surface of the main case portion 11. Details will be described later, and audio is emitted from the speaker 26 to the outside of the apparatus 10.

In the open state of the apparatus 10, a cushioning member 54 provided on an intermediate member 50 is exposed as shown in FIG. 2B. In the closed state, the cushioning member 54 protrudes toward the electronic key 70 and pushes an unlocking button 71 or a locking button 72. That is, the cushioning member 54 is controlled to be exposed in the open state but not to protrude toward the accommodating portion 60.

An accommodating recess 62 is formed in the accommodating portion 60. The accommodating recess 62 can accommodate the electronic key 70. A correct accommodating posture of the electronic key 70 in the accommodating recess 62 is a state in which a dedicated extension part 74 mounted in a key ring hole 73 is directed in a predetermined direction (Y-axis plus direction) with an operation surface on which the unlocking button 71 and the locking button 72 are provided facing upward.

The extension part 74 is an accessory part for drawing, out of the apparatus 10, a substitute for the key ring hole 73 that is hidden inside the apparatus 10 in the closed state. The extension part 74 includes, for example, a first ring 75 that passes through the key ring hole 73, a second ring 76 that protrudes outward from the apparatus 10, and a rod 77 that couples the two rings.

In the open state shown in FIG. 2B, the user can take out the accommodated electronic key 70 from the accommodating portion 60 as shown in FIG. 2C or can accommodate the taken out electronic key 70 in the accommodating portion 60 by fitting the electronic key 70 into the accommodating recess 62. When the user swings the accommodating portion 60 in the open state to the closed state shown in FIG. 2A and lightly presses the accommodating portion 60 against the main case portion 11, the main case portion 11 and the accommodating portion 60 are recoupled, and the accommodating portion 60 returns to the closed state shown in FIG. 2A and maintains in the closed state.

Figure 3:
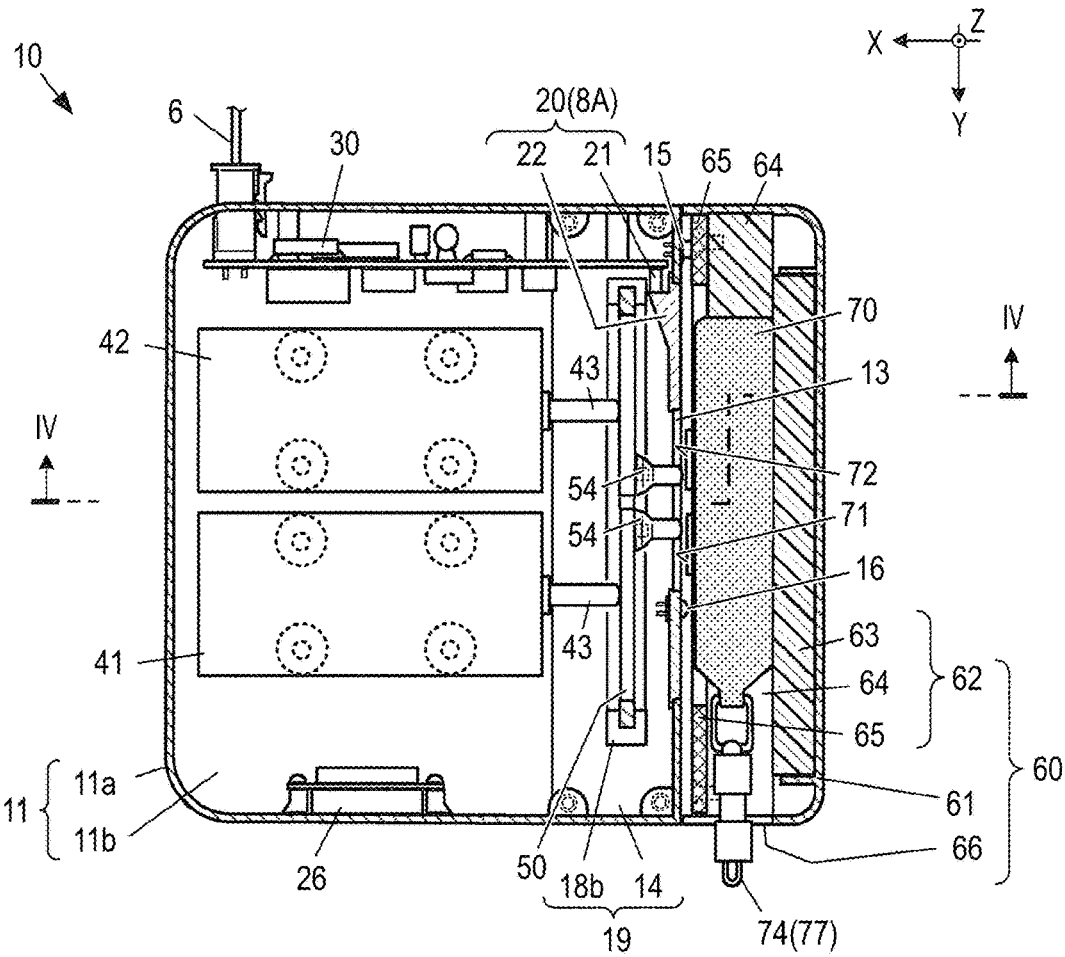
FIG. 3 is a diagram showing an example of an internal structure of the vehicle-mounted apparatus as viewed from a Z-axis plus direction.
Figure 4:
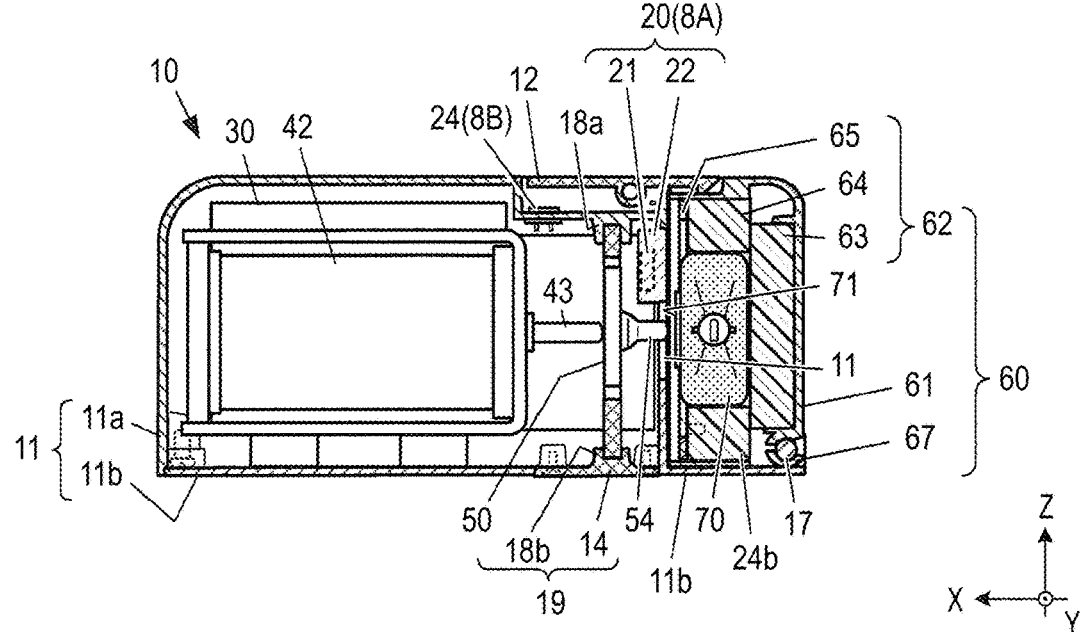
FIG. 4 is a diagram (part 1) showing an example of the internal structure of the vehicle-mounted apparatus as viewed from a Y-axis plus direction.
Figure 5:
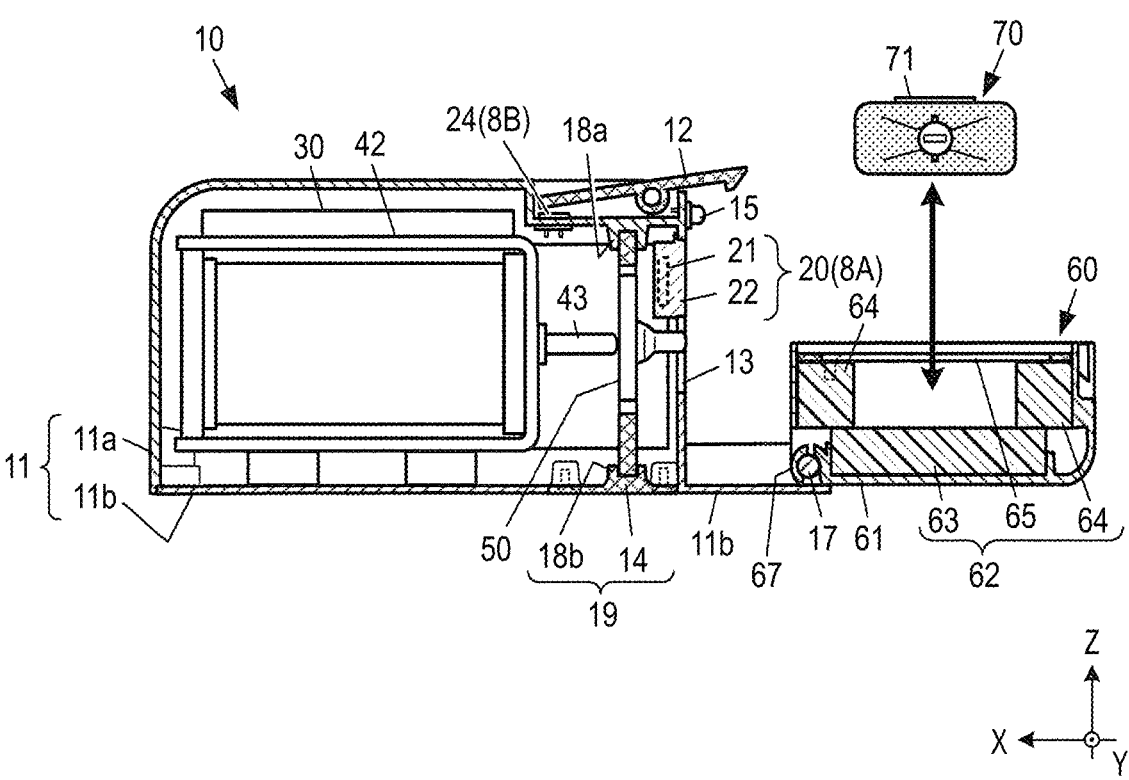
FIG. 5 is a diagram (part 2) showing the example of the internal structure of the vehicle-mounted apparatus as viewed from the Y-axis plus direction.

FIG. 3 is a diagram showing an example of an internal structure of the apparatus 10 as viewed from the Z-axis plus direction (from above). FIGS. 4 and 5 are diagrams showing an example of the internal structure of the apparatus 10 as viewed from the Y-axis plus direction (left side), and correspond to an IV-IV cross-sectional view (XZ cross-sectional view) shown in FIG. 3. FIG. 4 shows the closed state, and FIG. 5 shows the open state.

The main case portion 11 includes an upper case 11a, a lower case 11b, the opening and closing operation unit 12, a back cover 14, an opening and closing detection unit 15, an accommodating detection unit 16, an illumination 20, a guide light 24, the speaker 26, a control board 30, a first actuator 41, a second actuator 42, and the intermediate member 50. Power required in the apparatus 10 is supplied from a vehicle side by connecting a part of a cable 6 to a line of an electrical component of the vehicle 5. When the apparatus 10 includes a built-in battery, the built-in battery may be accommodated in the main case portion 11.

The main case portion 11 forms an internal space by screwing the upper case 11a and the lower case 11b together. The upper case 11a includes the opening and closing operation unit 12 at an upper portion thereof. A side surface of the upper case 11a in the X-axis minus direction functions as a partition wall between the main case portion 11 and the accommodating portion 60, and a communication hole 13 is formed in the vicinity of a center of the side surface, and an interior of the accommodating portion 60 communicates with the internal space of the main case portion 11. Specifically, the vicinity of the center of the side surface is a range including a portion facing the unlocking button 71 and the locking button 72 of the electronic key 70 accommodated in the closed state. The lower case 11b includes the detachable back cover 14 at a position below the intermediate member 50.

A position where the opening and closing operation unit 12 is installed can be set as appropriate. For example, assuming that the apparatus 10 is mainly mounted in the glove box, the opening and closing operation unit 12 may be provided on a side surface of the upper case 11a in the Y-axis minus direction or a side surface of the upper case 11a in the Y-axis plus direction. In this case, even when a vehicle inspection certificate or the like is put together in the glove box, the opening and closing operation unit 12 is not covered by the vehicle inspection certificate or the like, and usability can be ensured, which is preferable.

The opening and closing detection unit 15 detects an open state or a closed state of the accommodating portion 60 and outputs a detection signal to the control board 30. The opening and closing detection unit 15 is implemented by, for example, a push switch provided on an outer side surface of the upper case 11a in the X-axis minus direction, and is turned on when the accommodating portion 60 is closed.

The accommodating detection unit 16 detects that the electronic key 70 is accommodated in the accommodating portion 60 in the closed state, and outputs a detection signal to the control board 30. The accommodating detection unit 16 is implemented by, for example, a push switch provided on the outer side surface of the upper case 11a in the X-axis minus direction, and is turned on by being pushed by a body portion of the electronic key 70 accommodated in the closed state.

The illumination 20 is a first light emitting unit 8A prepared for the accommodating portion 60. The illumination 20 includes an illumination LED 21 and a light guide plate 22. The illumination LED 21 is connected to the control board 30, and is controlled to be turned on by the control board 30. The light guide plate 22 forms a part of a side surface of the main case portion 11 in the X-axis minus direction, and is a member whose surface emits light based on light emitted from the illumination LED 21.

The guide light 24 is a second light emitting unit 8B prepared for the opening and closing operation unit 12, and is implemented by, for example, an LED. The guide light 24 is connected to the control board 30, and is controlled to be turned on by the control board 30. Light of the guide light 24 is emitted outward from a gap between the main case portion 11 and the opening and closing operation unit 12. The opening and closing operation unit 12 itself may be made of a material having transparency and light diffusing properties, and the opening and closing operation unit 12 itself may appear as if the opening and closing operation unit 12 is shining by light emitted from the guide light 24.

The speaker 26 is connected to the control board 30, and emits audio corresponding to an audio signal output from the control board 30.

The control board 30 includes electronic components such as a central processing unit (CPU), an IC memory, a first wireless communication module, a second wireless communication module, a power control circuit, an interface IC, and an in-vehicle network communication IC, and various circuits (for example, a circuit serving as a storage unit for emitting audio from the speaker 26).

The control board 30 integrally controls an operation of the apparatus 10 by causing the CPU to execute a program stored in the IC memory.

The first wireless communication module is an example of a first communication unit 351 (see FIG. 8), and is connected to the network 9 (see FIG. 1: specifically, a wireless communication network such as a mobile phone network or a wireless LAN) to be communicably connected to the server system 1100. The second wireless communication module is an example of a second communication unit 352 (see FIG. 8), implements short-range wireless communication, and is communicably connected to the user terminal 1500 within a predetermined communication range. The power control circuit controls power supplied to the first actuator 41 and the second actuator 42. The interface IC controls input and output of signals between the CPU and electronic components such as the opening and closing detection unit 15, the accommodating detection unit 16, the illumination LED 21 of the illumination 20, the guide light 24, and the speaker 26.

The in-vehicle network communication IC is an example of an in-vehicle network communication unit 360 (see FIG. 8), is connected to an in-vehicle network of the vehicle 5, and communicates with an in-vehicle computer to acquire latest vehicle state information on the vehicle 5. For example, the in-vehicle network communication IC communicates with a powertrain system micro computer unit (MCU) to acquire information on whether an engine is operating or stopped, or communicates with a body system MCU to acquire information on a door locking state. The corresponding communication standard can be appropriately set according to the specifications of the vehicle 5. For example, it is preferable to support a controller area network (CAN).

The first actuator 41 and the second actuator 42 are drive units that are operated under drive current control by the control board 30 to perform a push button operation on the electronic key 70 accommodated in the accommodating portion 60. Specifically, the first actuator 41 and the second actuator 42 are implemented by push-type linear solenoids, and each push out a movable portion 43 (a push rod coupled to a movable iron core) by an electromagnetic force as a drive current is applied.

The first actuator 41 is fixed to the main case portion 11 in a posture in which a tip end of the movable portion 43 faces the unlocking button 71 of the electronic key 70 accommodated in the accommodating portion 60. The second actuator 42 is fixed to the main case portion 11 in a posture in which a tip end of the movable portion 43 faces the locking button 72 of the electronic key 70 accommodated in the accommodating portion 60.

The intermediate member 50 is disposed between the electronic key 70 accommodated in the accommodating portion 60, and the first actuator 41 and the second actuator 42. The intermediate member 50 is a member that transmits push-out of the movable portion 43 by the actuator to the push button (the unlocking button 71 or the locking button 72) of the electronic key 70 as a force of the push button operation. A plurality of types of intermediate members 50 corresponding to types of the electronic key 70 assumed are prepared for the apparatus 10. Details of the intermediate member 50 will be described later with reference to FIG. 6.

The accommodating portion 60 includes a sub-case portion 61, a first member 63, a second member 64, and a third member 65. The sub-case portion 61 is a tray-shaped component, and is an outer shell forming the accommodating portion 60. The sub-case portion 61 includes a claw-shaped shaft gripping portion 67. When the shaft gripping portion 67 grips a swing shaft 17, the sub-case portion 61 is pivotally supported by the main case portion 11 so as to be swingable in a direction parallel to an XZ plane. The swing shaft 17 is a shaft provided in the Y-axis direction at a lower end of the lower case 11b in the X-axis minus direction. In the closed state (see FIG. 4), the sub-case portion 61 is in a posture in which the accommodating recess 62 faces the main case portion 11 in the X-axis plus direction. In the open state (see FIG. 5), the sub-case portion 61 is in a posture in which the accommodating recess 62 faces upward. Details of the accommodating portion 60 will be described later with reference to FIG. 7.

Figure 6:
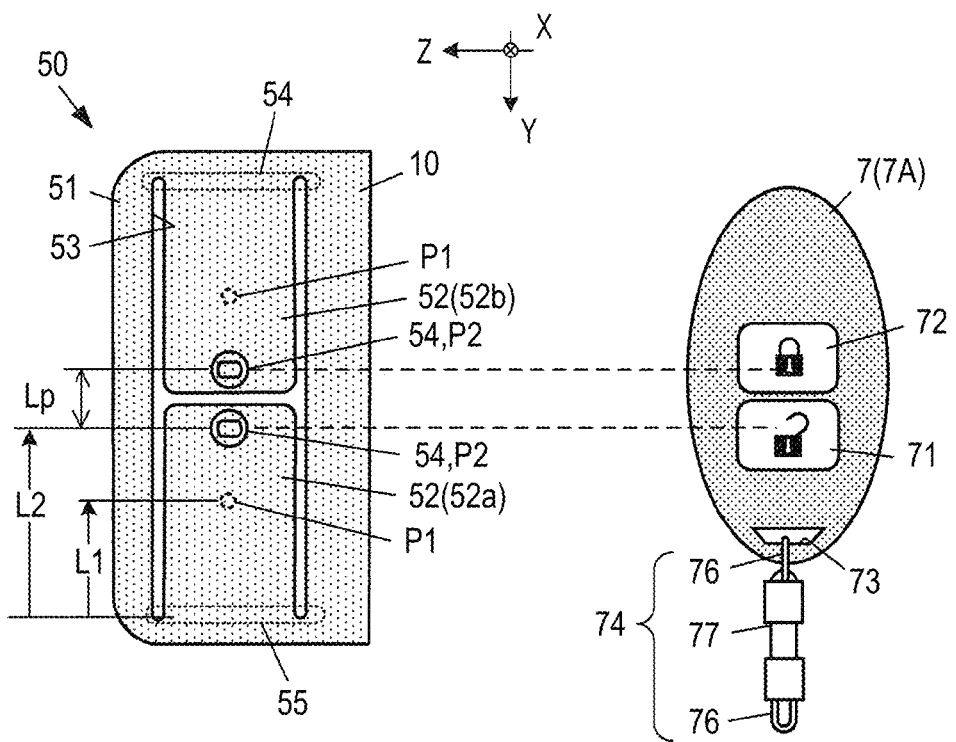
FIG. 6 is a diagram showing an example of an intermediate member as viewed from an X-axis minus direction.

FIG. 6 is a diagram showing an example of the intermediate member 50 as viewed from the X-axis minus direction. In order to show a corresponding positional relationship with respect to the intermediate member 50, FIG. 6 shows a positional relationship when the electronic key 70 is accommodated in the accommodating portion 60 and the apparatus 10 is in the closed state, and shows a front surface (operation surface) of the electronic key 70 as viewed from the X-axis plus direction for convenience.

The intermediate member 50 is an elastic plate-shaped member such as a metal plate or a synthetic resin plate, and includes an edge portion 51, a cantilever spring portion 52, and a gap 53. By forming the gap 53 in the plate-shaped member by cutting, die punching, or the like, the edge portion 51 and the cantilever spring portion 52 are formed in a single plate shape.

The intermediate member 50 is fixed by fitting the edge portion 51 into grooves of a first attachment portion 18a and a second attachment portion 18b of the main case portion 11 (see FIGS. 3 and 4). A Z-axis plus side of the edge portion 51 is fixed by being fitted into a groove of the first attachment portion 18a in the Y-axis direction, which is erected downward on an inner surface of the upper case 11a. A Z-axis minus side of the edge portion 51 is fixed by being fitted into a groove of the second attachment portion 18b that is erected on an inner surface of the back cover 14. Fitting between the edge portion 51, and the first attachment portion 18a and the second attachment portion 18b does not come off or shift due to vibration of the vehicle 5 or the like, and the intermediate member 50 is fitted into the grooves of the attachment portions 18 with a strength capable of being pulled out by hand. Insertion and removal of the intermediate member 50 is performed by removing the back cover 14. The back cover 14 and the second attachment portion 18b function as a holding portion 19 that holds the intermediate member 50 in a replaceable manner.

The cantilever spring portion 52 functions as a "cantilever-shaped leaf spring" by receiving a pressure from the movable portion 43 as the first actuator 41 and the second actuator 42 are operated. Specifically, two cantilever spring portions 52 are provided: a first cantilever spring portion 52a pushed by the first actuator 41 and a second cantilever spring portion 52b pushed by the second actuator 42.

The cantilever spring portion 52 (52a, 52b) has a force point portion P1 on one of both surfaces (on a side of the first actuator 41 and the second actuator 42; in the X-axis plus direction) with which the movable portion 43 of the actuator comes into contact. The other of both surfaces (on a side of the accommodating portion 60; in the X-axis minus direction) has an application point portion P2 for applying a force to the push button (the unlocking button 71 or the locking button 72) of the electronic key 70 accommodated in the accommodating portion 60.

The cushioning member 54 protrudes from the application point portion P2 toward the push button (see FIGS. 3 and 4). When the first actuator 41 and the second actuator 42 are operated, the cushioning member 54 is inserted into the communication hole 13 and comes into contact with the push button (the unlocking button 71 or the locking button 72) of the accommodated electronic key 70. An impact force generated when the movable portion 43 collides with the intermediate member 50 is transmitted to the push button of the electronic key 70 by the intermediate member 50, but the impact force is reduced by the cushioning member 54. The cushioning member 54 may be made of, for example, silicon, butyl rubber, or a spring.

A material of the intermediate member 50, a width and a plate thickness of a fulcrum portion 55 of the cantilever spring portion 52, a distance L1 from the fulcrum portion 55 to the force point portion P1, and a distance L2 from the fulcrum portion 55 to the application point portion P2 are selected and set so as to satisfy the following (1) to (3).

(1) When the first actuator 41 and the second actuator 42 are operated, the cantilever spring portion 52 is bent by a load received from the movable portion 43.

(2) A tip end of the cushioning member 54 comes into contact with the push button (the unlocking button 71 or the locking button 72) of the electronic key 70 accommodated in the accommodating portion 60 due to the bending according to (1), and a stroke sufficient to operate the push button is obtained due to the bending.

(3) A biasing force is sufficient to return the movable portion 43 of each of the first actuator 41 and the second actuator 42 in a non-operating state to positions before the operation due to a restoring force of the bending of the cantilever spring portion 52.

When each of the first actuator 41 and the second actuator 42 includes a built-in spring that returns the movable portion 43 to the position before the operation, (3) can be omitted. An elastic member such as a spring member that is mounted in a compressed state between the intermediate member 50 and the upper case 11*a* may be added to strengthen the restoring force according to (3).

When the first actuator 41 and the second actuator 42 are not operated, the cantilever spring portion 52 is in a state in which the cantilever spring portion 52 is not bent or substantially not bent. When the first actuator 41 and the second actuator 42 are operated, a transmission force to the push button (the unlocking button 71 or the locking button 72) is appropriately reduced by the bending of the cantilever spring portion 52 and the cushioning member 54, and the push button of the electronic key 70 is protected from the impact force.

By adopting the intermediate member 50 and the cushioning member 54 and appropriately setting specifications thereof, the apparatus 10 can cope with various types of electronic keys 70 having different arrangement of the push buttons (the unlocking button 71 and the locking button 72) of the electronic key 70 and different operation loads of the push buttons. For example, a type of the intermediate member 50 can be made different by making relative positions of the two application point portions P2 different, specifically, by making a distance Lp between a center of the unlocking button 71 and a center of the locking button 72 (button pitch; application point pitch) different.

Figure 7:
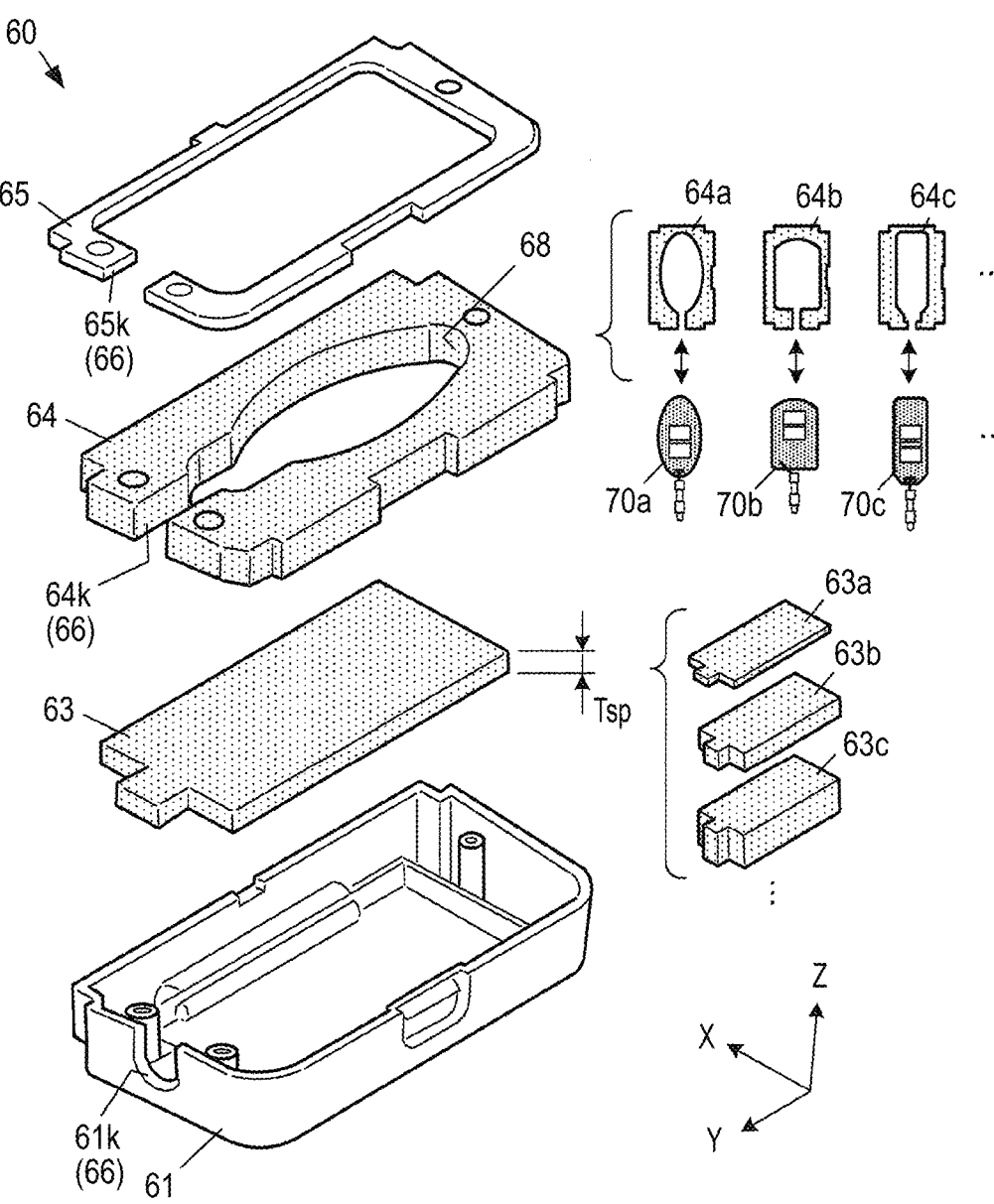
FIG. 7 is an exploded perspective view showing a configuration example of an accommodating portion.

FIG. 7 is an exploded perspective view showing a configuration example of the accommodating portion 60 in the open state. The accommodating portion 60 includes the sub-case portion 61, the first member 63, the second member 64, and the third member 65.

The sub-case portion 61 is a tray-shaped component, and is an outer shell forming the accommodating portion 60. In the open state (see FIG. 4), when the sub-case portion 61 is strongly pulled upward and away from the main case portion 11, the shaft gripping portion 67 is elastically deformed to an extent that the swing shaft 17 is pulled out, and finally the sub-case portion 61 is separated from the main case portion 11. Conversely, when the shaft gripping portion 67 is brought into contact with the swing shaft 17 and the sub-case portion 61 is pushed downward, the shaft gripping portion 67 spreads again to receive and grip the swing shaft 17, and the sub-case portion 61 is recoupled to the main case portion 11. Since the sub-case portion 61 is separable from the main case portion 11, the accommodating portion 60 can be removed from the main case portion 11 when setting up the accommodating portion 60, which brings high workability.

The accommodating recess 62 is a bottomed recess formed inside the sub-case portion 61 for accommodating the electronic key 70. The accommodating recess 62 is formed by the first member 63, the second member 64, and the third member 65.

The first member 63 is a thin plate-shaped member formed of a cushioning material such as hard sponge, and is fitted to a bottom side (Z-axis minus direction) of the sub-case portion 61 in the open state. The first member 63 serves as a bottom surface of the accommodating recess 62 that is in contact with a back surface of the accommodated electronic key 70. A plurality of types (63*a*, 63*b*, 63*c* . . . ) of the first member 63 are prepared with different thicknesses. An accommodating height of the electronic key 70 (a distance between the electronic key 70 accommodated in the accommodating portion 60 and a bottom of the sub-case portion 61) can be changed by selecting the first member 63 to be used.

The second member 64 is a thick plate-shaped member formed of a cushioning material such as hard sponge. The second member 64 has a cut-out portion 68 that is cut out along a contour of the electronic key 70 as viewed from a fitting direction (the Z-axis plus direction in the open state). A plurality of types (64*a*, 64*b*, 64*c* . . . ) of the second member 64 are prepared with different shapes of the cut-out portion 68. The shapes of the cut-out portion 68 are set to correspond to the assumed types (70*a*, 70*b*, 70*c* . . . ) of the electronic key 70. In the open state, after the first member 63 is fitted, the second member 64 is mounted by being inserted into sub-case portion 61 from the Z-axis plus direction.

The second member 64 forms an inner peripheral surface of the accommodating recess 62 and is in contact with an outer peripheral surface of the accommodated electronic key 70, thereby achieving positioning in a direction parallel to the operation surface of the accommodated electronic key 70 (positioning in a direction parallel to an XY plane in the accommodating portion 60 in the open state) and an effect of preventing slippage in the Z-axis direction due to frictional resistance. When the taken out electronic key 70 is fitted again, the second member 64 functions as a fitting guide. By appropriately selecting the second member 64 to be used, a plurality of types of electronic keys 70 having different contours and push button positions as viewed from the direction parallel to the operation surface can be accommodated at positions where the push button can be appropriately operated via the intermediate member 50.

The third member 65 is a thin plate-shaped member such as hard plastic or an aluminum plate. The third member 65 is a flat frame that is cut out along an edge of an opening of the sub-case portion 61. The third member 65 is screwed to the sub-case portion 61 from above the second member 64. The third member 65 serves as a frame body that maintains positions of the first member 63 and the second member 64 by holding an outer edge portion of the second member 64, thereby preventing the first member 63 and the second member 64 from falling off the accommodating portion 60 (the sub-case portion 61).

A communication opening 66 through which the accommodating recess 62 communicates with the outside is formed in the Y-axis plus direction of the accommodating portion 60 (see FIG. 3). The communication opening 66 is a space through which the extension part 74 of the accommodated electronic key 70 passes. In order to form the communication opening 66, the sub-case portion 61 has a notch 61*k*, the second member 64 has a communication portion 64*k*, and the third member 65 has a notch 65*k*.

An entire length (a length extended along the Y-axis direction) of the extension part 74 that passes through the communication opening 66 is set such that a second ring 76 is exposed to the outside from the communication opening 66 (see FIGS. 2B and 2C). Since the extension part 74 is exposed from the accommodating portion 60, the user can confirm at a glance from the outside that the electronic key 70 is accommodated. Since the extension part 74 is exposed, the user can use the extension part 74 as a grip when removing the electronic key 70 from the accommodating portion 60.

A setting sheet is included in a part of an instruction manual for the apparatus 10. The setting sheet is a quick reference table for setting of the vehicle 5 of each vehicle type. On the setting sheet, a combination of any type of the intermediate member 50, any type of the first member 63, and any type of the second member 64 is described in association with each vehicle type. When the accommodating recess 62 is formed by a combination of the first member 63 and the second member 64 described on the setting sheet, the electronic key 70 of the vehicle 5 of a vehicle type corresponding to the combination is accommodated in the accommodating recess 62 of the accommodating portion 60, and the operation surface of the electronic key 70 is at a position satisfying a predetermined "accommodating height condition" and the push button is at a position satisfying a predetermined "push button operable position condition".

The "accommodating height condition" is a position condition related to a height when the electronic key 70 is accommodated in the accommodating recess 62. The position condition is a condition for a height (a position in the X-axis direction in FIGS. 3 and 4) at which the corresponding push button of the electronic key 70 can be operated via the intermediate member 50 when the first actuator 41 and the second actuator 42 are operated in the closed state. The "push button operable position condition" is a position condition related to a direction parallel to the operation surface of the electronic key 70 when the electronic key 70 is accommodated in the accommodating recess 62. The position condition is a condition indicating that a central position of the push button of the accommodated electronic key 70 in the closed state is within a range obtained by projecting the communication hole 13 in the X-axis direction (see FIGS. 3 and 4).

The administrator of the sharing system 3 selects the intermediate member 50, the first member 63, and the second member 64 suitable for a vehicle type (that is, a type of the electronic key 70) of the vehicle 5 on which the apparatus 10 is mounted, with reference to the setting sheet, as setup work related to the apparatus 10. Then, the administrator removes the back cover 14 (see FIG. 4), attaches the selected intermediate member 50 to the second attachment portion 18b, and attaches the back cover 14 to return to an original state. As the back cover 14 is attached, an upper end portion of the intermediate member 50 is fitted into the first attachment portion 18a. Then, the intermediate member 50 is fixed at a predetermined position inside the main case portion 11.

Next, the administrator operates the opening and closing operation unit 12 to swing the accommodating portion 60 to the open state. Then, the administrator fits the selected first member 63 into the bottom of the empty sub-case portion 61. Since a shape of the first member 63 and an inner shape of the sub-case portion 61 are in a protruding-recessed relationship, the first member 63 is prevented from being fitted into the sub-case portion 61 in an incorrect posture.

The administrator fits the selected second member 64 into the sub-case portion 61 from above the first member 63 fitted in the bottom of the sub-case portion 61. Since a shape of the second member 64 and the inner shape of the sub-case portion 61 are in a protruding-recessed relationship, the second member 64 is prevented from being fitted into the sub-case portion 61 in an incorrect posture.

The administrator screws the third member 65 to the sub-case portion 61 so as to cover the second member 64 fitted in the sub-case portion 61 from above. The shape of the second member 64 and the inner shape of the sub-case portion 61 are in a relationship in which the third member 65 cannot be screwed unless the notch 65k corresponding to the communication opening 66 is oriented in the Y-axis plus direction. This prevents the third member 65 from being fitted in an incorrect posture.

Then, the administrator of the sharing system 3 attaches the dedicated extension part 74 to the key ring hole 73 of the electronic key 70 of the vehicle 5 on which the apparatus 10 is mounted. Further, a name tag for management may be attached to the second ring 76.

Figure 8:
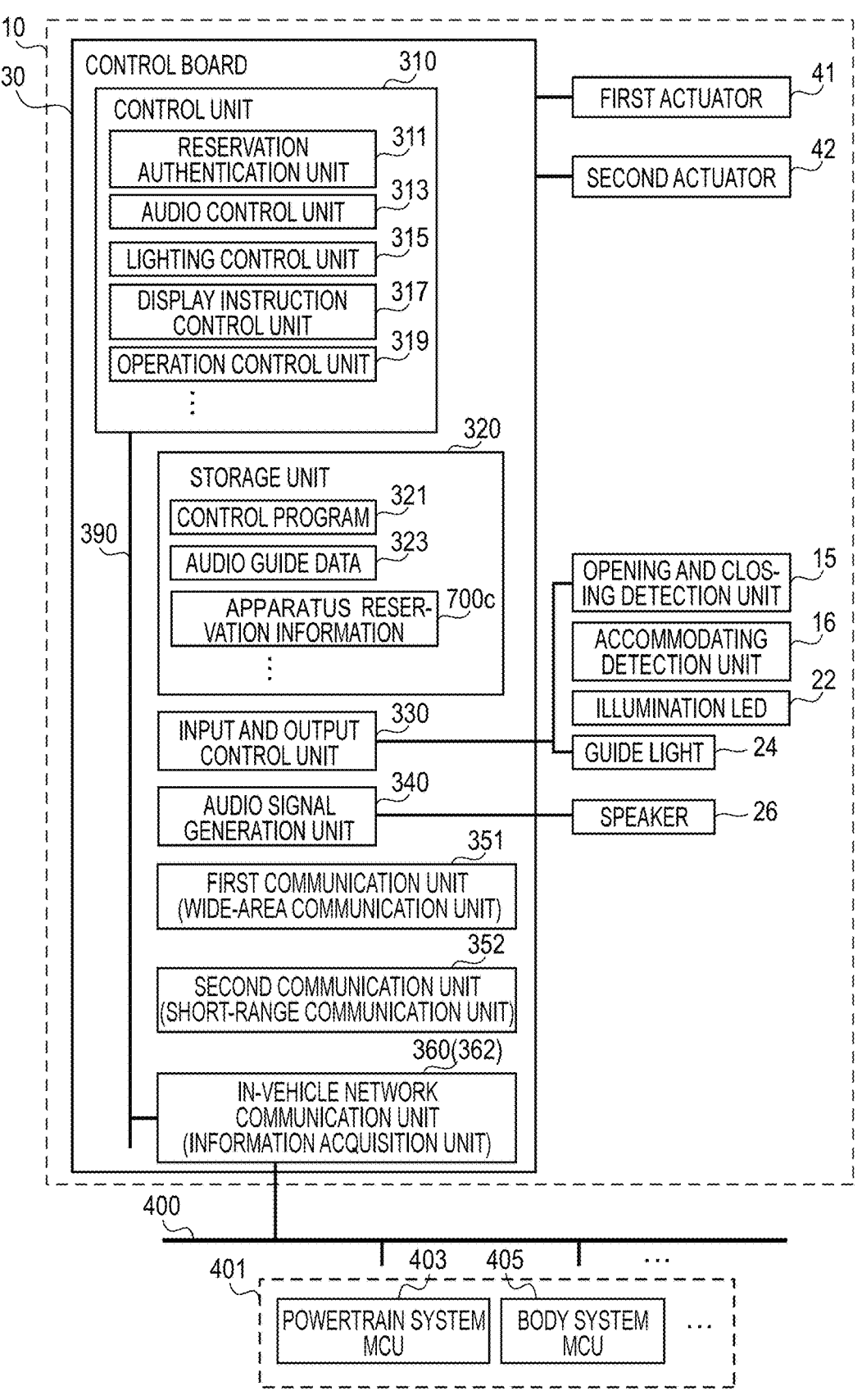
FIG. 8 is a functional block diagram showing a functional configuration example of the vehicle-mounted apparatus.

FIG. 8 is a functional block diagram showing a functional configuration example of the apparatus 10. The apparatus 10 includes a control unit 310, a storage unit 320, an input and output control unit 330, an audio signal generation unit 340, the first communication unit 351, the second communication unit 352, the in-vehicle network communication unit 360, and an internal bus 390.

The control unit 310 is implemented by, for example, various IC chips such as a CPU and a power control circuit, and integrally controls an operation of the apparatus 10. Some of functions of the control unit 310 are implemented by reading and executing a control program 321 stored in the storage unit 320.

The control unit 310 includes a reservation authentication unit 311, an audio control unit 313, a lighting control unit 315, a display instruction control unit 317, and an operation control unit 319. In addition, the control unit 310 appropriately includes various functional units to be provided as a computer. For example, a function as a current date and time management unit or a timing unit such as a timer is provided.

The reservation authentication unit 311 performs (1) control of periodically accessing the server system 1100, acquiring a copy of the reservation information 700 on the host apparatus, and storing the copy as the apparatus reservation information 700c in the storage unit 320, and (2) control of comparing the user backup reservation information 700t (see FIG. 1) acquired from the user terminal 1500 connected for data communication with the apparatus reservation information 700c, and authenticating a reservation content and a user.

The audio control unit 313 refers to audio guide data 323 stored in advance in the storage unit 320, and controls the speaker 26 to emit given audio guidance related to a handling procedure of the apparatus 10 when the vehicle 5 is used.

The audio guidance includes audio of various contents. Specifically, the audio guidance includes, as service-in guidance for taking out the electronic key 70 from the accommodating portion 60, opening and closing operation guidance for prompting an operation on the opening and closing operation unit 12 and take-out guidance for taking out the electronic key 70 from the accommodating portion 60. The audio guidance further includes, as service-out guidance for placing the electronic key 70 into the accommodating portion 60, the opening and closing operation guidance for prompting the operation on the opening and closing operation unit 12 and accommodating guidance for placing the electronic key 70 into the accommodating portion 60.

The audio control unit 313 performs progress control as to which audio guidance is emitted at which timing, based on a detection result from the opening and closing detection unit 15 or the accommodating detection unit 16, and vehicle state information on the vehicle 5 acquired from an in-vehicle computer 401 (for example, a powertrain system MCU 403 or a body system MCU 405) via the in-vehicle network communication unit 360.

The lighting control unit 315 controls lighting of the light emitting units 8 (8A, 8B) in conjunction with audio emission control of the audio guidance by the audio control unit 313. Specifically, the lighting control unit 315 controls lighting of the guide light 24 (second light emitting unit 8B) and controls lighting of the illumination 20 (first light emitting unit 8A) in conjunction with audio emission control of the service-in guidance by the audio control unit 313. Further, the lighting control unit 315 controls lighting of the guide light 24 and controls lighting of the illumination 20 in conjunction with audio emission control of the service-out guidance.

The display instruction control unit 317 controls the user terminal 1500 to display given guidance display via the second communication unit 352 in conjunction with audio emission control of the audio guidance by the audio control unit 313.

The operation control unit 319 controls driving of the first actuator 41 and the second actuator 42. The apparatus 10 controls a push button operation on the electronic key 70 to control opening and closing of a door lock of the vehicle 5.

The storage unit 320 is implemented by, for example, an IC memory, and stores the control program 321, the audio guide data 323, and the apparatus reservation information 700c. The storage unit 320 also appropriately stores information such as the current date and time, various flags, and timers.

The audio guide data 323 is audio data (audio guidance data) for implementing an audio guide, text data that is a basis of audio synthesis, or the like, and makes a content of each audio guidance identifiable.

The input and output control unit 330 is implemented by, for example, an interface IC, and controls input and output of the opening and closing detection unit 15, the accommodating detection unit 16, the illumination LED 21 of the illumination 20, and the guide light 24.

The audio signal generation unit 340 generates an audio signal for causing the speaker 26 to emit audio based on the audio guide data 323, and outputs the audio signal to the speaker 26. The audio signal generation unit 340 may be implemented by, for example, an audio synthesis IC or arithmetic processing of the control unit 310.

The first communication unit 351 supports wide-area communication corresponding to movement of the vehicle 5 to be shared, and implements data communication with the server system 1100 via the network 9. The first communication unit 351 is implemented by, for example, a communication device connected to a mobile phone network.

The second communication unit 352 implements short-range communication connection with the user terminal 1500. The second communication unit 352 is implemented by a short-range wireless device.

The in-vehicle network communication unit 360 functions as an information acquisition unit 362 that is connected to an in-vehicle network 400 and acquires the latest vehicle state information on the vehicle 5 from the in-vehicle computer 401. The in-vehicle network communication unit 360 may be implemented by, for example, an in-vehicle network communication IC.

Figure 9:
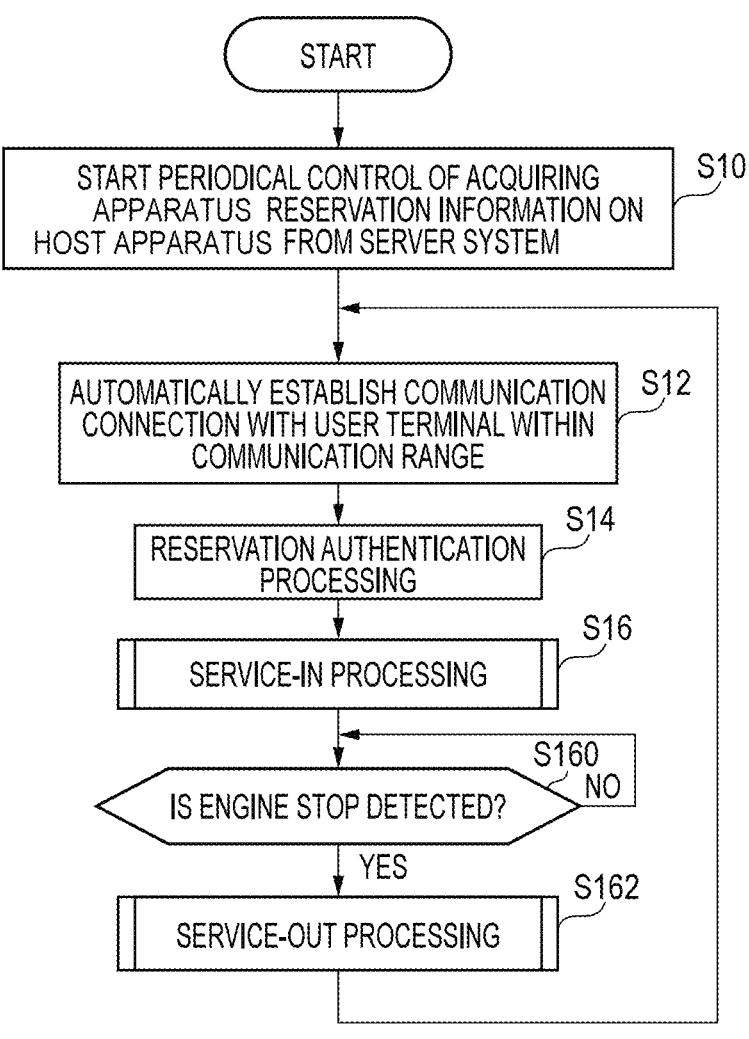
FIG. 9 is a flowchart showing a flow of processing by the vehicle-mounted apparatus.

FIG. 9 is a flowchart showing a flow of processing by the apparatus 10 from when a user who has made a reservation starts using the vehicle 5 to be shared (service-in) to when the use ends (service-out). The flow of processing to be described below is implemented by the CPU of the control board 30 reading the control program 321 from the IC memory and executing the control program 321. It is assumed that, in the apparatus 10, the authorized electronic key 70 of the vehicle 5 on which the host apparatus is mounted is accommodated in a correct accommodating posture, and the accommodating portion 60 is in the closed state. The user executes the terminal program 502 on the own user terminal 1500.

When the apparatus 10 is supplied with power, the CPU automatically reads the control program 321 from the IC memory and executes the control program 321. When execution of the control program 321 is started, the apparatus 10 periodically communicates with the server system 1100 using the first communication unit 351, acquires a copy of the reservation information 700 on the host apparatus from the server system 1100, and starts control of storing the copy as the apparatus reservation information 700c in the storage unit 320 (step S10).

The apparatus 10 to which the power is supplied automatically detects communication connection with the user terminal 1500 existing within a communication range of the second communication unit 352 (short-range wireless). Then, the detected communication connection with the user terminal 1500 is established (step S12), and reservation authentication processing is executed (step S14).

In the reservation authentication processing, the apparatus 10 executes various types of authentication related to a start of use of the vehicle 5 based on the reservation information. For example, the apparatus 10 acquires the user backup reservation information 700t from the user terminal 1500 and compares the user backup reservation information 700t with the apparatus reservation information 700c. The reservation date and time are compared with the current date and time. In addition, authentication of a user account, a password, and the like may be appropriately executed.

When the reservation authentication is appropriately executed and it is approved that the use is valid based on valid reservation, the apparatus 10 executes service-in processing (step S16). The service-in processing will be described later with reference to FIGS. 10 and 11. When the apparatus 10 detects that an engine is stopped after the service-in processing (YES in step S160), the apparatus 10 regards that the user may want to be out of service, and executes service-out processing (step S162). When the engine stop is not detected (NO in step S160), the apparatus 10 repeats the processing in step S160 until the engine stop is detected. The service-out processing will be described later with reference to FIGS. 12 and 13.

Figure 10:
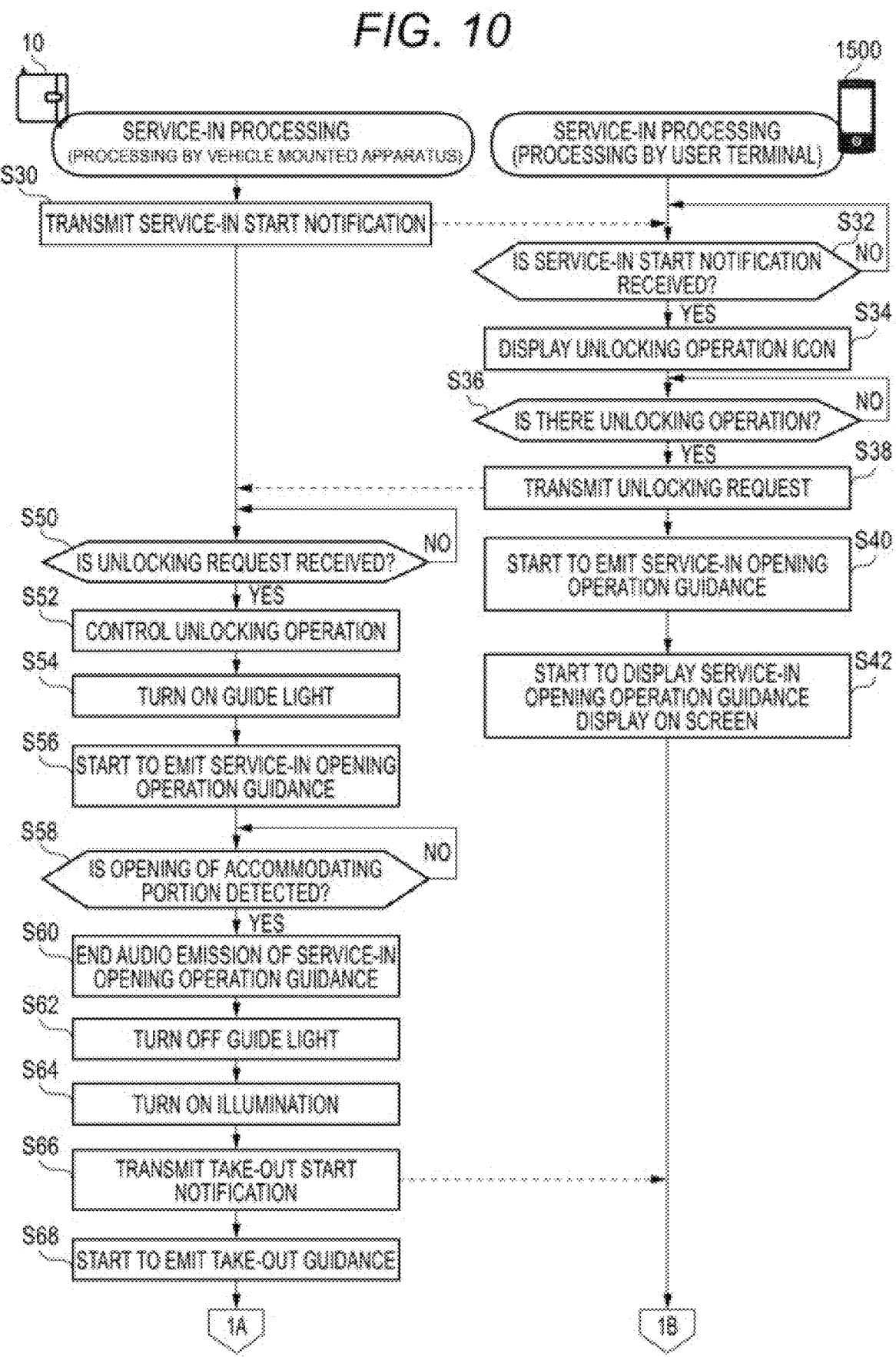
FIG. 10 is a flowchart showing a flow of processing by the vehicle-mounted apparatus and a flow of processing by a user terminal related to service-in processing.

FIGS. 10 and 11 are flowcharts showing a flow of processing by the apparatus 10 and a flow of processing by the user terminal 1500 related to the service-in processing. In the service-in processing, the apparatus 10 transmits a predetermined service-in start notification to the user terminal 1500 (step S30). The notification corresponds to an instruction to control the user terminal 1500 to display an image related to audio emission and guidance for audio related to audio guidance (guidance display) in conjunction with audio emission control of the audio guidance by the apparatus 10. Other notifications from the apparatus 10 to the user terminal 1500 to be described in the following flowcharts have the same meaning.

The user terminal 1500 is in a standby state for receiving the service-in start notification from the apparatus 10 (NO in step S32), and when receiving the service-in start notification (YES in step S32), displays an image of a predetermined unlocking operation icon on a screen (step S34), and receives an unlocking operation input by the user. The user terminal 1500 determines that there is an unlocking operation based on the operation input to the icon (YES in step S36), and transmits a predetermined unlocking request to the apparatus 10 (step S38). When there is no operation input to the icon in step S36 (NO), processing of standing by until there is an input operation, or ending the screen display when there is still no operation input to the icon after a predetermined time, and the like is executed.

The user terminal 1500 starts to emit opening operation guidance as a part of service-in guidance from a speaker of the host apparatus (step S40), and displays an opening operation guidance image (guidance display) on the screen (step S42).

The opening operation guidance as a part of the service-in guidance is one of opening and closing operation guidance for prompting an operation on the opening and closing operation unit 12, and prompts the user to open the accommodating portion 60 by swinging. For example, when it is assumed that the apparatus 10 is installed in a glove box, audio of the opening operation guidance is audio reading "Please press the button on the upper surface of the apparatus in the glove box to open the tray".

Wording of the opening operation guidance may be other than this, and can be appropriately set. For example, the wording "in the glove box" may be appropriately changed as long as it is a name of a position where the apparatus 10 is installed. Preferably, a dip switch is mounted on the control board 30, and the audio guide data 323 having different installation position names is selected and applied according to setting of the dip switch.

Figure 14:
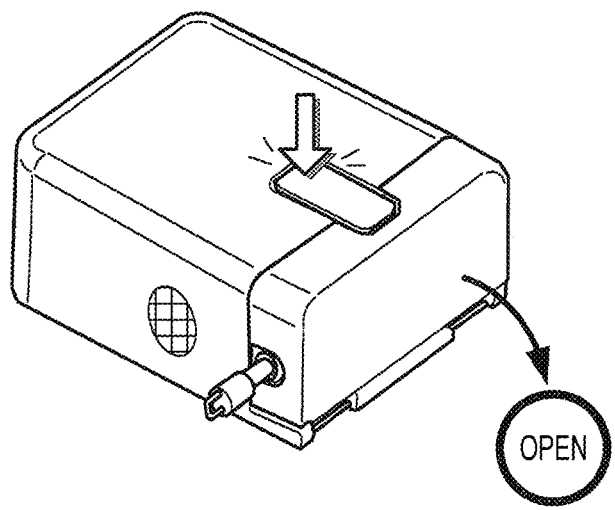
FIG. 14 is a diagram (part 1) showing an example of service-in opening operation guidance display.
Figure 15:
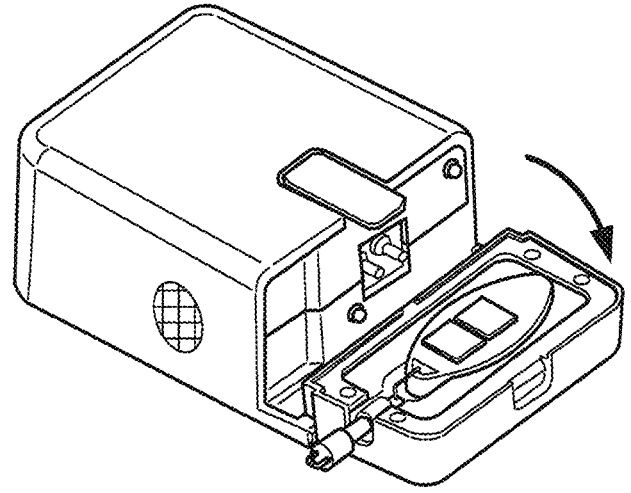
FIG. 15 is a diagram (part 2) showing the example of the service-in opening operation guidance display.

Display of a service-in opening operation guidance image is display of an image that visually notifies the user of contents of the service-in opening operation guidance. When displaying the service-in opening operation guidance image, for example, illustrations as shown in FIGS. 14 and 15 are alternately displayed. Alternatively, both are displayed by animation connecting the two.

With reference back to FIG. 10, when the apparatus 10 receives the unlocking request in a standby state for receiving the unlocking request (NO in step S50) (YES in step S50), the apparatus 10 drives and controls the first actuator 41 to unlock a door of the vehicle 5 (step S52). Then, the apparatus 10 turns on the guide light 24 (step S54), and starts to emit the service-in opening operation guidance from the speaker 26 (step S56).

By emitting the service-in opening operation guidance from the apparatus 10, the user can be notified where the apparatus 10 is mounted on the vehicle 5 by audio. By lighting (including blinking) of the guide light 24, it is possible to inform the user who hears or views the guidance for a part to be operated indicated by the guidance.

An operation in which the user finds a mounting position of the apparatus 10 in the vehicle 5 and open the accommodating portion 60 by swinging is much easier to be performed, for example, even when the apparatus 10 is mounted in a dark glove box or when in a dark environment such as at night or in a bad weather, than when no audio guide or guide light 24 is provided.

The apparatus 10 can know an open state or a closed state of the accommodating portion 60 based on input from the opening and closing detection unit 15. The apparatus 10 monitors whether the accommodating portion 60 is swung to be in the open state after audio emission of the service-in opening operation guidance is started (NO in step S58), and when the open state of the accommodating portion 60 is detected (YES in step S58), the apparatus 10 ends the audio emission of the guidance (step S60), turns off the guide light 24 (step S62), and turns on (including: makes to blink) the illumination 20 (step S64).

By turning off the guide light 24 and turning on the illumination 20, it is possible to clearly indicate to the user that the part to be operated has changed. The illumination 20 is useful for illuminating the hand of the user when the user takes out the electronic key 70 from the accommodating portion 60. It is much easier to take out the electronic key 70 from the accommodating portion 60 even when the apparatus 10 is mounted in the dark glove box or when in the dark environment such as at night or in the bad weather, than when no illumination 20 is provided.

Next, the apparatus 10 transmits a predetermined take-out start notification to the user terminal 1500 (step S66), and starts to emit, from the speaker 26, take-out guidance as a part of the service-in guidance (step S68). The take-out guidance prompts the user to take out the electronic key 70 from the accommodating portion 60. For example, the audio of the take-out guidance is audio reading "Please take out the key and return the tray to the original position". A content to be read out is not limited thereto, and can be appropriately set.

Figure 16:
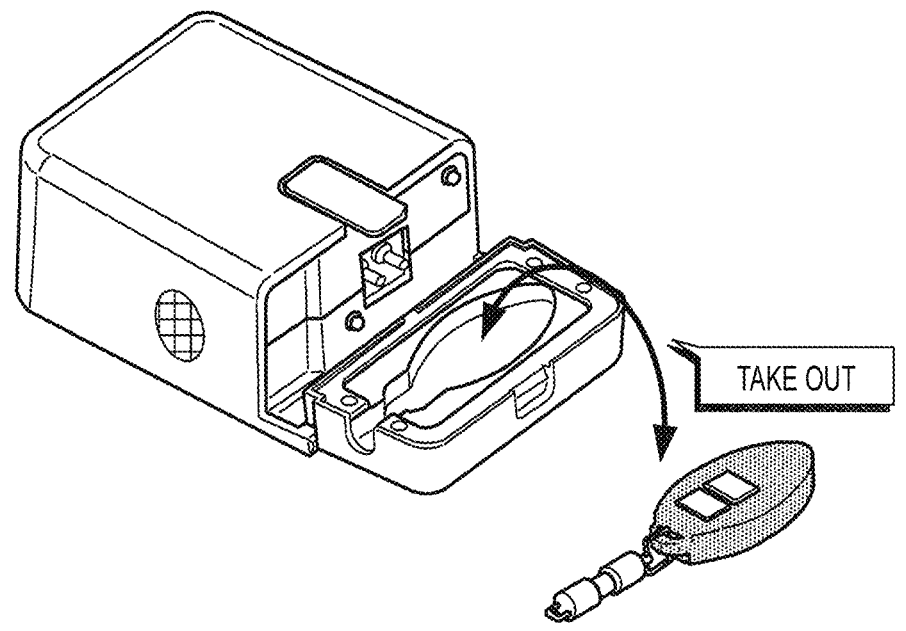
FIG. 16 is a diagram (part 1) showing an example of take-out guidance display.
Figure 17:
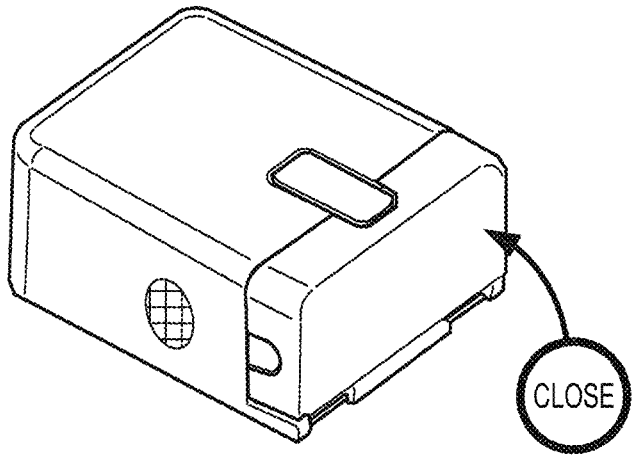
FIG. 17 is a diagram (part 2) showing the example of the take-out guidance display.

Moving to FIG. 11, when the user terminal 1500 receives the take-out start notification in a standby state for receiving the take-out start notification (NO in step S80) from the apparatus 10 (YES in step S80), the user terminal 1500 ends the audio emission of the service-in opening operation guidance and ends the display of the service-in opening operation guidance image (step S82). Then, the user terminal 1500 starts to emit the take-out guidance from the speaker (step S84), and starts to display a take-out guidance image (guidance display) on the screen (step S86). When displaying the take-out guidance image, for example, illustrations as shown in FIGS. 16 and 17 are alternately displayed. Alternatively, both are displayed by animation connecting the two.

The user understands the contents of the operation to be performed after taking out the electronic key 70 accommodated in the accommodating recess 62 of the accommodating portion 60 from the audio and image of the take-out guidance. The user takes out the electronic key 70 using the extension part 74 as a grip, and closes the accommodating portion 60 after taking out the electronic key 70.

When the apparatus 10 detects that the accommodating portion 60 is closed based on detection of the opening and closing detection unit 15 (YES in step S100), the apparatus 10 determines whether the electronic key 70 is accommodated based on detection of the accommodating detection unit 16 (step S102).

If the electronic key 70 is not accommodated (NO in step S102), the apparatus 10 regards that the user has successfully taken out the electronic key 70, turns off the illumination 20 (step S104), ends audio emission of the take-out guidance (step S106), and transmits a predetermined take-out completion notification to the user terminal 1500 (step S108). If the electronic key 70 is accommodated (YES in step S102), the apparatus 10 regards that the user has not successfully taken out the electronic key 70, and continues lighting (including blinking) of the illumination 20. In addition, the take-out guidance is to be continued. This allows the user to quickly notice that the accommodating portion 60 is closed while the electronic key 70 is accommodated.

Subsequently, the apparatus 10 starts to emit advance notice guidance from the speaker 26 (step S110). The advance notice guidance is guidance that explains procedures at the time of service-out. For example, the advance notice guidance is audio reading "Please return the key to the original position at the time of service-out". By emitting the advance notice guidance at a service-in stage, the user is made to prepare for the procedures at the time of service-out, and the user can smoothly perform various procedures at the time of actual service-out.

Figure 18:
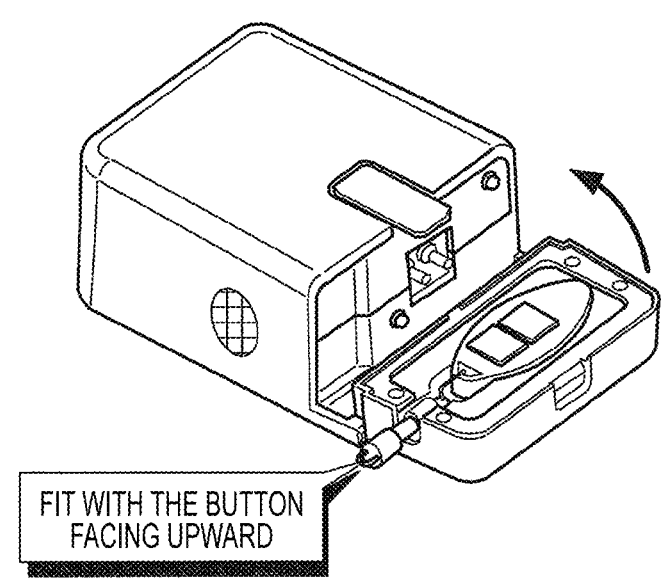
FIG. 18 is a diagram (part 1) showing an example of advance notice guidance display.
Figure 19:
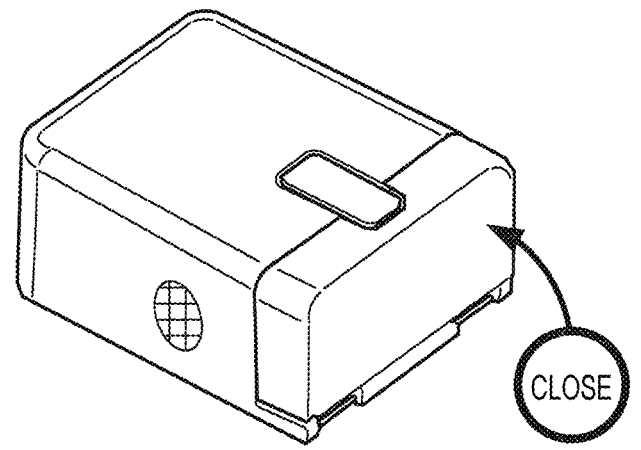
FIG. 19 is a diagram (part 2) showing the example of the advance notice guidance display.

On the other hand, when the user terminal 1500 receives the take-out completion notification in a standby state for receiving the take-out completion notification (NO in step S120) (YES in step S120), the user terminal 1500 ends the audio emission of the take-out guidance and ends display of the take-out guidance image (step S122). Audio emission of the advance notice guidance from the speaker of the user terminal 1500 is started (step S124), and screen display of an advance notice guidance image (guidance display) is started (step S126). When displaying the advance notice guidance image, for example, illustrations as shown in FIGS. 18 and 19 are alternately displayed. Alternatively, both are displayed by animation connecting the two.

After the user has successfully taken out the electronic key 70 from the accommodating portion 60 according to the procedures indicated by the take-out guidance, the engine of the vehicle 5 is started. The apparatus 10 can be communicably connected to the powertrain system MCU 403 (see FIG. 8) to acquire information on an operation state of the engine. When the apparatus 10 detects an engine start (YES in step S140), the apparatus 10 ends the audio emission of the advance notice guidance (step S142), transmits a predetermined engine start notification to the user terminal 1500 (step S144), and ends the service-in processing.

When the user terminal 1500 receives the engine start notification in a standby state for receiving the engine start notification (NO in step S150) (YES in step S150), the user terminal 1500 ends the audio emission of the advance notice guidance and ends screen display of advance notice guidance display (step S152).

When the user starts using the vehicle 5 without taking out the electronic key 70 from the apparatus 10 in step S102 (YES in step S102), it is determined that the electronic key 70 remains accommodated, and thus the illumination 20 remains turned on, and the take-out guidance continues to be repeatedly emitted. Then, it is determined that the service-in processing is not correctly executed, and the engine is controlled not to be started.

When use of the vehicle 5 is started without closing the accommodating portion 60 (NO in step S100) after the user removes the electronic key 70, a closed state of the accommodating portion 60 is not detected in step S100, and the take-out guidance continues to be repeatedly emitted in both the apparatus 10 and the user terminal 1500. Then, it is determined that the service-in processing is not correctly executed, and the engine is controlled not to be started.

When the apparatus 10 is not mounted in a glove box or a console box, if the accommodating portion 60 remains in an open state, dust or the like may enter the accommodating portion 60 to cause problems. The user in the vehicle 5 may also hit and damage the accommodating portion 60. Therefore, it is important to close the accommodating portion 60 properly after the electronic key 70 is taken out.

Figure 12:
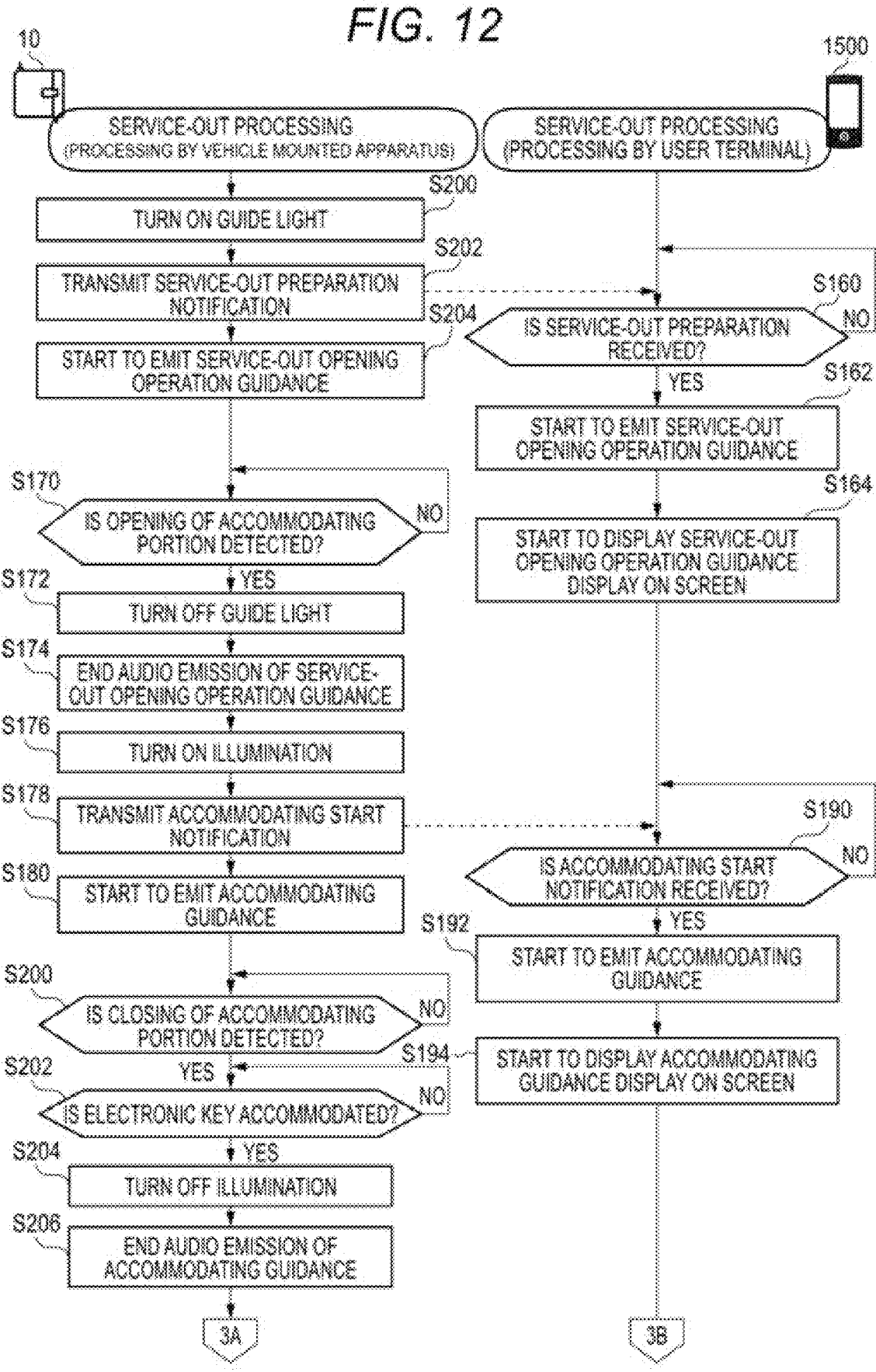
FIG. 12 is a flowchart showing a flow of processing by the vehicle-mounted apparatus and a flow of processing by the user terminal related to service-out processing.
Figure 13:
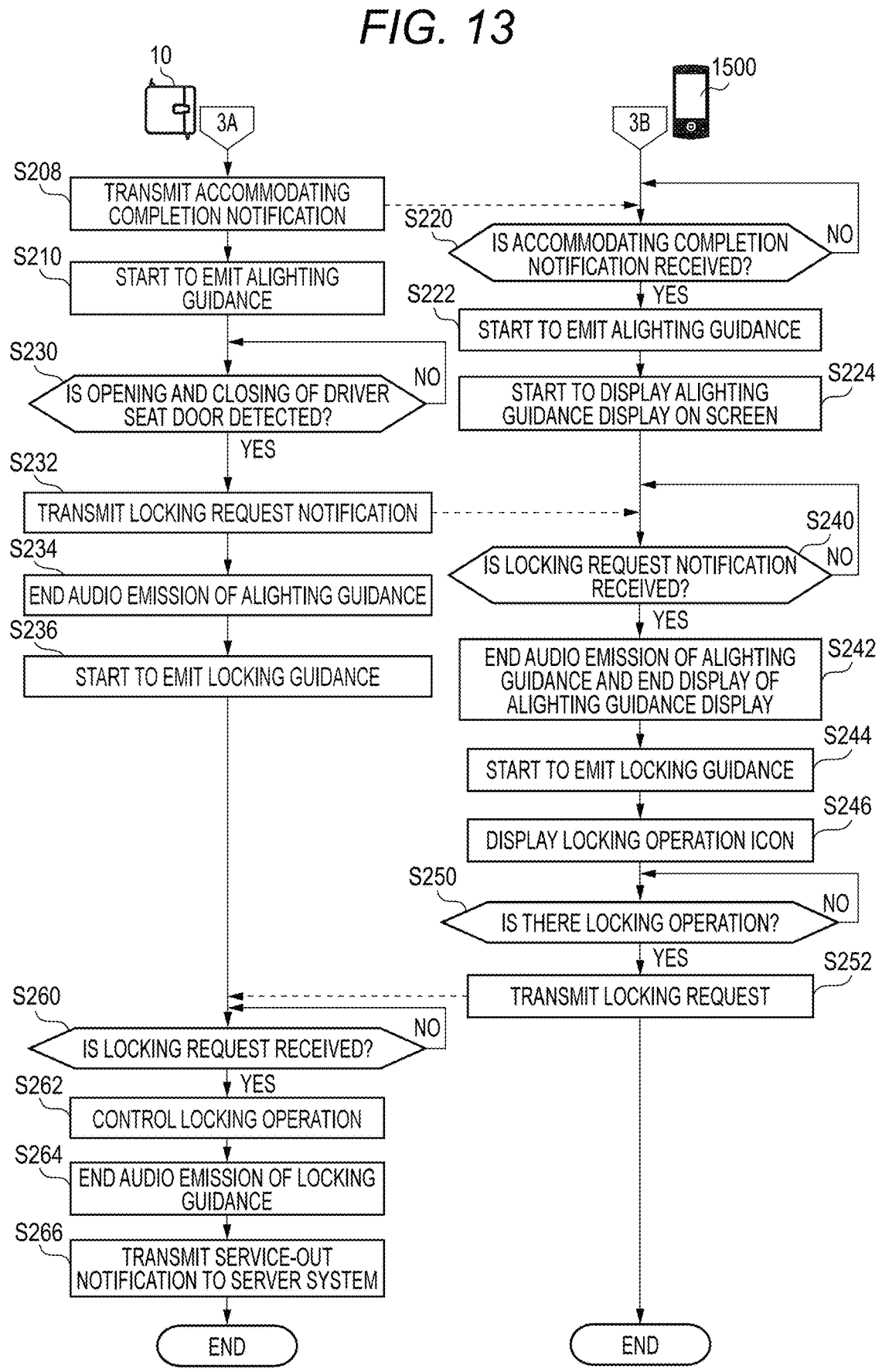
FIG. 13 is a flowchart following FIG. 12.

FIGS. 12 and 13 are flowcharts showing a flow of processing by the apparatus and a flow of processing by the user terminal related to the service-out processing. In the processing, the apparatus 10 turns on the guide light 24 (step S200) and transmits a predetermined service-out preparation notification to the user terminal 1500 (step S202). Subsequently, the apparatus 10 starts to emit opening operation guidance as a part of the service-out guidance (step S204).

The opening operation guidance as a part of the service-out guidance is one of the opening and closing operation guidance. For example, when it is assumed that the apparatus 10 is installed in the glove box, there is audio reading "It is necessary to return the key for service-out. Please press the button on the upper surface of the apparatus in the glove box to open the tray".

Wording to be read may be other than this and can be appropriately set. For example, the wording "in the glove box" may be appropriately changed as long as it is a name of a position where the apparatus 10 is installed. Preferably, a dip switch is mounted on the control board 30, and the audio guide data 323 having different installation position names is selected and applied according to setting of the dip switch.

Figure 20:
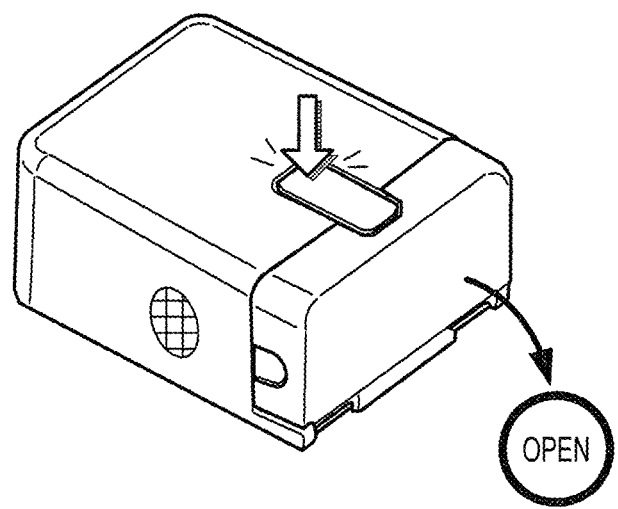
FIG. 20 is a diagram (part 1) showing an example of opening operation guidance display for service-out.
Figure 21:
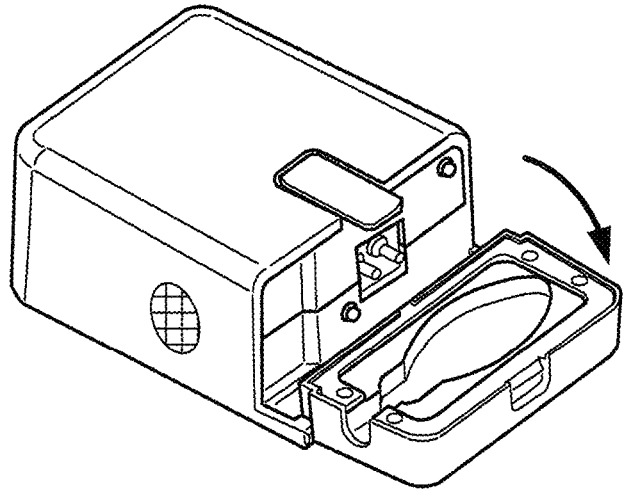
FIG. 21 is a diagram (part 2) showing the example of the opening operation guidance display for the service-out.

When the user terminal 1500 receives the service-out preparation notification in a standby state for receiving the service-out preparation notification (NO in step S160) (YES in step S160), the user terminal 1500 starts to emit the opening operation guidance as a part of the service-out guidance from the speaker of the user terminal 1500 (step S162), and starts to display an opening operation guidance image (guidance display) as a part of the service-out guidance on the screen (step S164). When displaying the guidance image, for example, illustrations as shown in FIGS. 20 and 21 are alternately displayed. Alternatively, both are displayed by animation connecting the two.

The user understands from the audio and image of the service-out opening operation guidance that it is necessary to open the accommodating portion 60 as a procedure for service-out. The user operates the opening and closing operation unit 12 to open the accommodating portion 60 with the lighting of the guide light 24 as a mark.

When the apparatus 10 detects that the accommodating portion 60 is opened (YES in step S170) in a state of detecting whether the accommodating portion 60 is opened (NO in step S170), the apparatus 10 turns off the guide light 24 (step S172) and stops audio emission of the service-out opening operation guidance (step S174).

The apparatus 10 turns on the illumination 20 (step S176), transmits a predetermined accommodating start notification to the user terminal 1500 (step S178), and starts to emit accommodating guidance as a part of the service-out guidance (step S180).

The accommodating guidance prompts the user to accommodate the electronic key 70 in the accommodating portion 60. For example, the accommodating guidance is audio reading "Please fit the key into the tray with the button facing upward and close the tray to the original state".

When the user terminal 1500 receives the accommodating start notification in a standby state for receiving the accommodating start notification (NO in step S190) (YES in step S190), the user terminal 1500 starts to emit the accommodating guidance from the speaker of the user terminal 1500 (step S192), and starts to display an accommodating guidance image (guidance display) on the screen (step S194). When displaying the accommodating guidance image, for example, illustrations as shown in FIGS. 18 and 19 are alternately displayed. Alternatively, both are displayed by animation connecting the two.

The user can immediately understand from the audio and image of the accommodating guidance and execute a correct accommodating procedure for the electronic key 70. Since the illumination 20 is turned on, the electronic key 70 can be correctly fitted according to a shape of the accommodating recess 62 regardless of whether in the glove box or at night.

The apparatus 10 detects that the accommodating portion 60 is closed (YES in step S200) in a state of detecting whether the accommodating portion 60 is closed (NO in step S200). Then, it is detected whether the electronic key 70 is accommodated in the accommodating portion 60 (NO in step S202), and when it is detected that the electronic key 70 is accommodated (YES in step S202), the illumination 20 is turned off (step S204), and audio emission of the accommodating guidance is ended (step S206).

Moving to FIG. 13, the apparatus 10 subsequently transmits an accommodating completion notification to the user terminal 1500 (step S208), and starts to emit alighting guidance as a part of the service-out guidance (step S210). The alighting guidance prompts the user to get out of the vehicle and perform a locking operation from the user terminal 1500. For example, the alighting guidance is audio reading "Please get out of the vehicle and lock the door from the user terminal".

Figure 22:
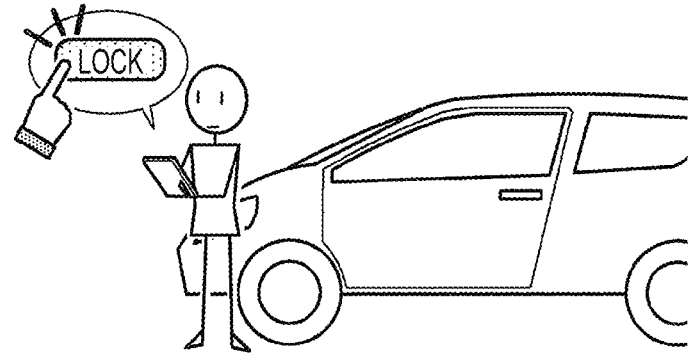
FIG. 22 is a diagram showing an example of alighting guidance display.

When the user terminal 1500 receives the accommodating completion notification in a standby state for receiving the accommodating completion notification (NO in step S220) (YES in step S220), the user terminal 1500 starts to emit the alighting guidance from the speaker of the user terminal 1500 (step S222), and starts to display an alighting guidance image (guidance display) on the screen (step S224). When displaying the alighting guidance image, for example, an illustration as shown in FIG. 22 is displayed.

The apparatus 10 can communicate with the body system MCU 405 via the in-vehicle network 400 to acquire information on a vehicle body situation such as opening and closing of a door of the vehicle 5 (see FIG. 8). When the apparatus 10 detects that a door on a driver seat side is opened and closed (YES in step S230) in a state of detecting whether the door on the driver seat side is opened and closed (NO in step S230), the apparatus 10 regards that the user has left the vehicle, transmits a locking request notification to the user terminal 1500 (step S232), ends audio emission of the alighting guidance (step S234), and starts to emit locking guidance (step S236).

The locking guidance prompts the user to perform the locking operation on the user terminal 1500. For example, the locking guidance is audio for reading "When the locking operation icon of the terminal is operated, the vehicle is locked and the service-out occurs".

When the user terminal 1500 receives the locking request notification in a standby state for receiving the locking request notification (NO in step S240) (YES in step S240), the user terminal 1500 ends audio emission of the alighting guidance and ends display of the alighting guidance image (step S242). Then, the user terminal 1500 starts to emit the locking guidance from the speaker of the terminal (step S244), and displays a locking operation icon on the screen (step S246).

When the user terminal 1500 detects that an operation input to the locking operation icon is performed by the user (YES in step S250) in a state of detecting whether the operation input to the locking operation icon is performed by the user (NO in step S250), the user terminal 1500 transmits a predetermined locking request to the apparatus 10 (step S252).

When the apparatus 10 receives the locking request in a standby state for receiving the locking request (NO in step S260) (YES in step S260), the apparatus 10 executes locking operation control to drive the second actuator 42 to perform a push button operation on the locking button 72 of the accommodated electronic key (step S262). Then, the apparatus 10 ends audio emission of the locking guidance (step S264), is communicably connected to the server system 1100, transmits a predetermined service-out notification (step S266), and ends the service-out processing.

As described above, according to the present embodiment, it is possible to improve usability of the apparatus 10 that accommodates the electronic key 70.

The embodiment of the present invention is not limited to the above configuration, and components can be changed, added, or omitted without departing from the scope of the invention.

For example, a timeout can be appropriately set for the determination step in the above flowchart. The number of times and duration of audio emission may also be appropriately limited for audio emission of various types of guidance. The audio emission of the guidance may also be omitted in the user terminal 1500.

Figure 23:
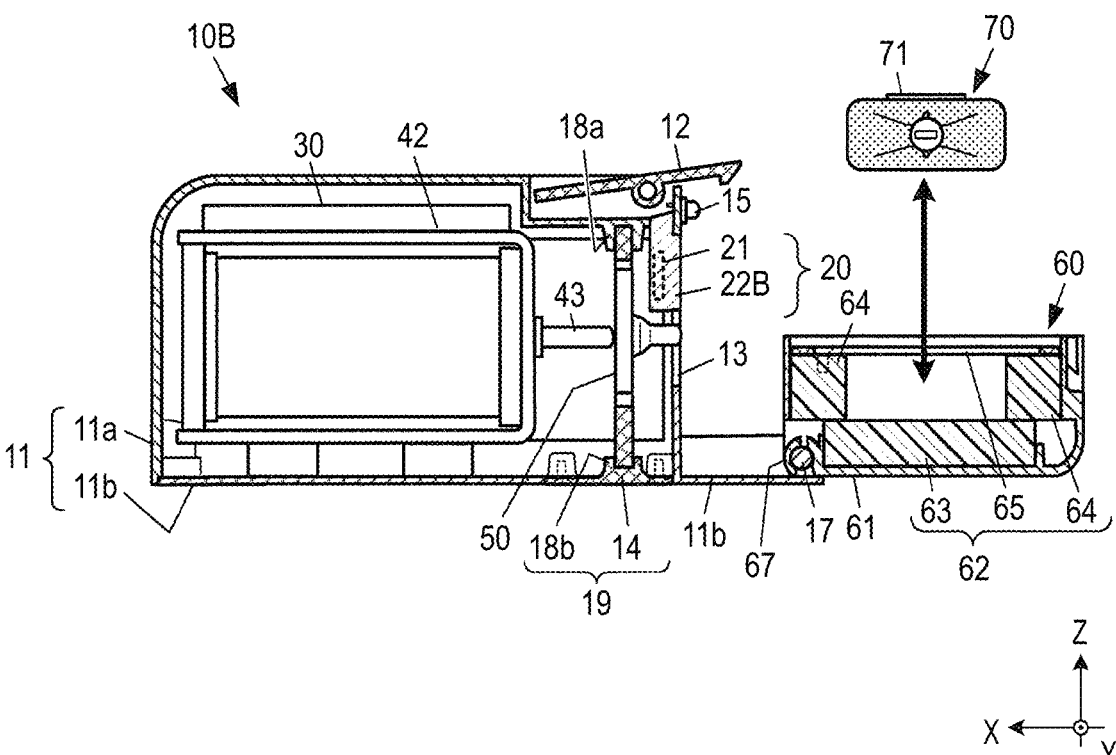
FIG. 23 is a diagram showing a modification of the internal structure of the vehicle-mounted apparatus as viewed from a plus side in a Y-axis direction.

The apparatus 10 according to the above embodiment includes two light emitting units 8, that is, the illumination LED 21 of the illumination 20 and the guide light 24, but may be implemented by combining two light emitting units into one. Specifically, as in a light guide plate 22B shown in FIG. 23, the light guide plate 22B is disposed so as to guide light of the illumination LED 21 to a lower side of the opening and closing operation unit 12 as well, and the guide light 24 is omitted. Then, the step of turning on or off the illumination 20 and the step of turning on or off the guide light 24 in the above flowchart may be replaced with a step of turning on or off the illumination LED 21. That is, in this configuration, the illumination 20 also serves as the guide light 24 according to the above embodiment.

SUMMARY

The disclosure of the present specification according to the above-described embodiment can be summarized as follows.

According to an aspect of the present disclosure, there is provided a vehicle-mounted apparatus for accommodating an electronic key of a vehicle, and the vehicle-mounted apparatus includes: a speaker; a light emitting unit; an audio control unit configured to control the speaker to emit given audio guidance related to a handling procedure of the vehicle-mounted apparatus when the vehicle is used; and a lighting control unit configured to control lighting of the light emitting unit in conjunction with audio emission control of the audio guidance by the audio control unit.

According to this aspect, the vehicle-mounted apparatus can emit the audio guidance related to the handling procedure of the vehicle-mounted apparatus when the vehicle is used, and control the lighting of the light emitting unit in conjunction with the audio guidance. A user can be accurately notified of a part to be operated at a timing when an operation is to be performed. The lighting of the light emitting unit can provide illumination necessary for an operation of taking out or accommodating the electronic key.

According to this aspect, usability of the vehicle-mounted apparatus that accommodates the electronic key can be improved.

The vehicle-mounted apparatus may further include: an accommodating portion configured to accommodate the electronic key; and an opening and closing operation unit configured to open and close the accommodating portion, and the audio guidance may include take-out guidance for taking out the electronic key from the accommodating portion and accommodating guidance for placing the electronic key into the accommodating portion.

The light emitting unit may include an illumination configured to illuminate the accommodating portion, and the lighting control unit may control lighting of the illumination in conjunction with audio emission control of the take-out guidance and the accommodating guidance by the audio control unit.

The light emitting unit may include a guide light configured to indicate the opening and closing operation unit, the audio guidance may include opening and closing operation guidance for prompting an operation on the opening and closing operation unit, and the lighting control unit may control lighting of the guide light in conjunction with audio emission control of the opening and closing operation guidance by the audio control unit.

The light emitting unit may include an illumination configured to illuminate the accommodating portion, and a guide light configured to indicate the opening and closing operation unit, and the audio guidance may include, as service-in guidance for taking out the electronic key from the accommodating portion, opening and closing operation guidance for prompting an operation on the opening and closing operation unit and take-out guidance for taking out the electronic key from the accommodating portion, and as service-out guidance for placing the electronic key into the accommodating portion, the opening and closing operation guidance and accommodating guidance for placing the electronic key into the accommodating portion. The lighting control unit may control lighting of the guide light and then control lighting of the illumination in conjunction with audio emission control of the service-in guidance by the audio control unit, and may control lighting of the guide light and then control lighting of the illumination in conjunction with audio emission control of the service-out guidance by the audio control unit.

The vehicle-mounted apparatus may further include: a communication unit configured to communicate with a user terminal of a user who uses the vehicle; and a display instruction control unit configured to control the user terminal to display given guidance display via the communication unit in conjunction with audio emission control of the audio guidance by the audio control unit.

The user terminal can be used as an element that executes guidance, and usability can be further improved.

The vehicle-mounted apparatus further includes: an actuator configured to perform a push button operation on the accommodated electronic key; and an operation control unit configured to operate the actuator when an instruction to open or close a door of the vehicle is received from the user terminal via the communication unit.

REFERENCE SIGNS LIST

3: sharing system
8: light emitting unit
10: vehicle-mounted apparatus
11: main case portion 12: opening and closing operation unit
15: opening and closing detection unit
16: accommodating detection unit
20: illumination
21: illumination LED
22: light guide plate
24: guide light
26: speaker
30: control board
41: first actuator
42: second actuator
50: intermediate member
60: accommodating portion
61: sub-case portion
62: accommodating recess
70: electronic key
71: unlocking button
72: locking button
310: control unit
311: reservation authentication unit
313: audio control unit
315: lighting control unit
317: display instruction control unit
319: operation control unit
320: storage unit
321: control program
323: audio guide data
330: input and output control unit
340: audio signal generation unit
351: first communication unit
352: second communication unit
1100: server system
1500: user terminal

The invention claimed is:

1. A vehicle-mounted apparatus for accommodating an electronic key of a vehicle, the vehicle-mounted apparatus comprising:
   a speaker;
   a light emitter; and
   a controller configured to control the speaker and the light emitter,
   wherein the controller performs:
      an audio emission control to make the speaker to emit given audio guidance related to a handling procedure of the vehicle-mounted apparatus when the vehicle is used; and
      a lighting control of the light emitter,
      wherein the controller repeatedly performs the audio emission control and continues the lighting control until a completion of a predetermined operation of a user based on the handling procedure is detected.

2. The vehicle-mounted apparatus according to claim 1, further comprising:
   an accommodating portion configured to accommodate the electronic key; and
   an opening and closing device for opening and closing the accommodating portion, wherein
   the audio guidance includes take-out guidance for taking out the electronic key from the accommodating portion and accommodating guidance for placing the electronic key into the accommodating portion.

3. The vehicle-mounted apparatus according to claim 2, wherein
   the light emitter includes an illumination configured to illuminate the accommodating portion, and the controller performs the lighting control of the illumination with the audio emission control of the take-out guidance and the accommodating guidance.

4. The vehicle-mounted apparatus according to claim 2, wherein the light emitter includes a guide light configured to indicate the opening and closing device, the audio guidance includes opening and closing operation guidance for prompting an operation on the opening and closing device, and the controller performs the lighting control of the guide light with the audio emission control of the opening and closing operation guidance.

5. The vehicle-mounted apparatus according to claim 2, wherein the light emitter includes an illumination configured to illuminate the accommodating portion, and a guide light configured to indicate the opening and closing device, the audio guidance includes, as service-in guidance for taking out the electronic key from the accommodating portion, opening and closing operation guidance for prompting an operation on the opening and closing device and take-out guidance for taking out the electronic key from the accommodating portion, and as service-out guidance for placing the electronic key into the accommodating portion, the opening and closing operation guidance and accommodating guidance for placing the electronic key into the accommodating portion, and the controller performs:

the lighting control of the guide light with the audio emission control of the service-in guidance, and then performs the lighting control of the illumination, and the lighting of the guide light with the audio emission control of the service-out guidance, and then performs the lighting control of the illumination.

6. The vehicle-mounted apparatus according to claim 1, further comprising:

a communication circuit configured to communicate with a user terminal of the user who uses the vehicle, wherein the controller makes the user terminal to display given guidance display via the communication circuit with the audio emission control of the audio guidance.

7. The vehicle-mounted apparatus according to claim 6, further comprising:

an actuator configured to perform a push button operation on the accommodated electronic key, wherein the controller operates the actuator when an instruction to open or close a door of the vehicle is received from the user terminal via the communication circuit.

* * * * *